(12) United States Patent
Georgeson et al.

(10) Patent No.: US 12,122,332 B2
(45) Date of Patent: Oct. 22, 2024

(54) SYSTEMS AND METHODS FOR AUTOMATED IN-SITU SWAPPING OF BATTERIES FOR ELECTRIC VEHICLES

(71) Applicant: The Boeing Company, Chicago, IL (US)

(72) Inventors: Gary E. Georgeson, Tacoma, WA (US); Tyler E. Berkey, Charleston, SC (US); Alexander J. Coco, Seattle, WA (US)

(73) Assignee: The Boeing Company, Arlington, VA (US)

(*) Notice: Subject to any disclaimer, the term of this patent is extended or adjusted under 35 U.S.C. 154(b) by 321 days.

(21) Appl. No.: 17/518,269

(22) Filed: Nov. 3, 2021

(65) Prior Publication Data
US 2022/0212638 A1    Jul. 7, 2022

Related U.S. Application Data

(60) Provisional application No. 63/133,763, filed on Jan. 4, 2021.

(51) Int. Cl.
| | |
|---|---|
| *B60S 5/06* | (2019.01) |
| *B60L 53/62* | (2019.01) |
| *B60L 53/80* | (2019.01) |
| *B60W 60/00* | (2020.01) |
| *G05D 1/00* | (2006.01) |

(52) U.S. Cl.
CPC ............. *B60S 5/06* (2013.01); *B60L 53/62* (2019.02); *B60L 53/80* (2019.02); *B60W 60/00256* (2020.02); *G05D 1/12* (2013.01)

(58) Field of Classification Search
CPC ............ B60L 53/62; B60L 53/80; B60S 5/06; B60W 60/00256; G05D 1/0225; G05D 1/0246; G05D 1/12
See application file for complete search history.

(56) References Cited

U.S. PATENT DOCUMENTS

| | | |
|---|---|---|
| 4,983,903 A | 1/1991 | Bae et al. |
| 5,542,488 A * | 8/1996 | Nixon ..................... B60L 58/18 180/68.5 |
| 9,098,997 B2 | 8/2015 | Stewart et al. |

(Continued)

*Primary Examiner* — Matthew J. Reda
(74) *Attorney, Agent, or Firm* — Ostrager Chong Flaherty & Broitman P.C.

(57) ABSTRACT

Systems and methods for automated swapping of a charged replacement battery for a depleted battery onboard an electric vehicle using a battery delivery vehicle (BDV). The BDV may be configured to operate autonomously or under remote control. The electric vehicle which receives the replacement battery from a BDV may be configured to operate autonomously (e.g., an AGV) or non-autonomously (e.g., an electric passenger car). The BDV is loaded with a fully (or partially) charged battery, and then moved to a rendezvous place at which the BDV is underneath and aligned with the electric vehicle. The battery is uploaded to the electric vehicle while the aligned BDV moves in tandem with the electric vehicle. After the replacement battery has been installed, the power distribution system onboard the electric vehicle switches over to draw DC power from the replacement battery (instead of from a depleted battery) without interrupting vehicle operation.

20 Claims, 18 Drawing Sheets

(56) References Cited

U.S. PATENT DOCUMENTS

| | | |
|---|---|---|
| 9,312,523 B2 | 4/2016 | Choi et al. |
| 9,481,458 B2 | 11/2016 | Magana et al. |
| 9,637,093 B2 | 5/2017 | Droste |
| 9,688,252 B2 | 6/2017 | Gaffoglio et al. |
| 10,363,826 B2 | 7/2019 | Wang |
| 10,394,234 B2 | 8/2019 | Salour et al. |
| 10,513,247 B2 | 12/2019 | Clarke et al. |
| 10,562,398 B2 | 2/2020 | High et al. |
| 2006/0184013 A1* | 8/2006 | Emanuel .................. G01S 5/16 600/426 |
| 2006/0273756 A1* | 12/2006 | Bowling ................ B60L 53/68 320/107 |
| 2008/0012518 A1* | 1/2008 | Yamamoto ........... G05D 1/0225 318/568.12 |
| 2012/0306445 A1* | 12/2012 | Park ....................... B60L 53/80 29/730 |
| 2013/0081245 A1* | 4/2013 | Vavrina .................. B60L 53/51 29/281.1 |
| 2014/0130344 A1* | 5/2014 | Choi .................... H01M 50/202 29/729 |
| 2016/0368464 A1* | 12/2016 | Hassounah ............ B60L 53/80 |
| 2017/0283090 A1 | 10/2017 | Miller et al. |
| 2017/0327091 A1* | 11/2017 | Capizzo ................ B64U 80/86 |
| 2018/0141453 A1* | 5/2018 | High .................... G08G 5/0069 |
| 2018/0251102 A1* | 9/2018 | Han .................... H01M 50/578 |
| 2018/0306867 A1* | 10/2018 | Bertness ............. H01M 10/54 |
| 2019/0009756 A1* | 1/2019 | Jacobs .................. B60L 53/80 |
| 2020/0307409 A1 | 10/2020 | Uyeki |
| 2020/0341472 A1* | 10/2020 | Zenner ............... B60W 60/005 |
| 2021/0031647 A1* | 2/2021 | Arima ...................... B60S 5/06 |
| 2021/0047121 A1* | 2/2021 | Stevens ............... B65G 1/1376 |

\* cited by examiner

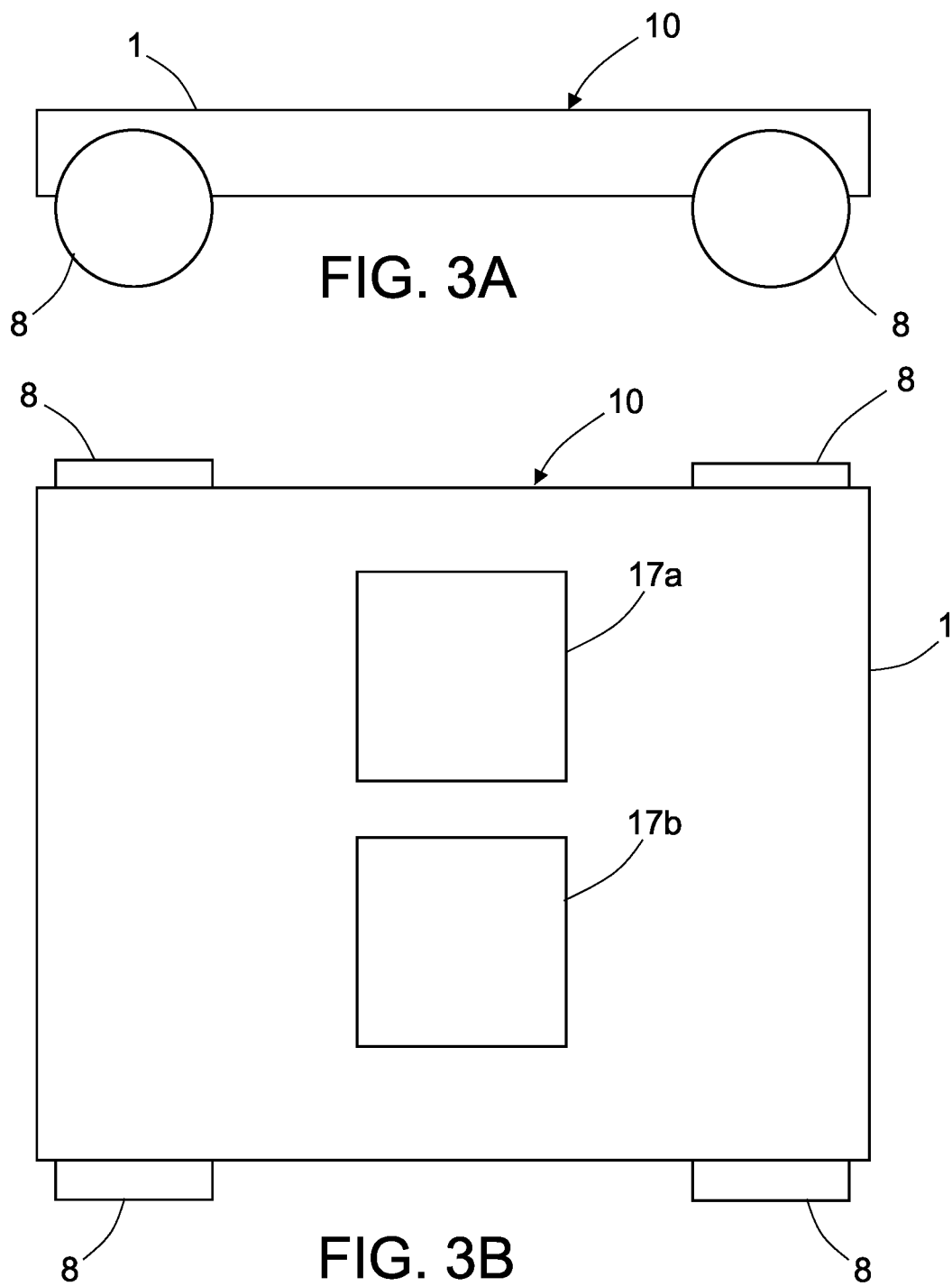

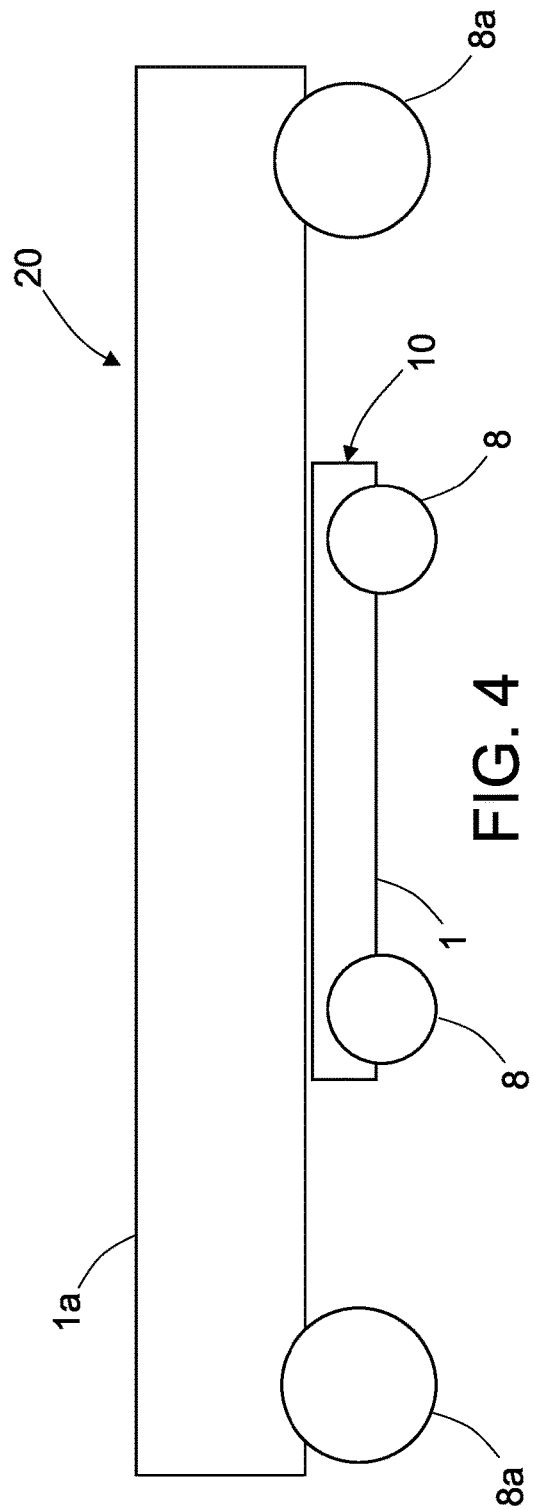
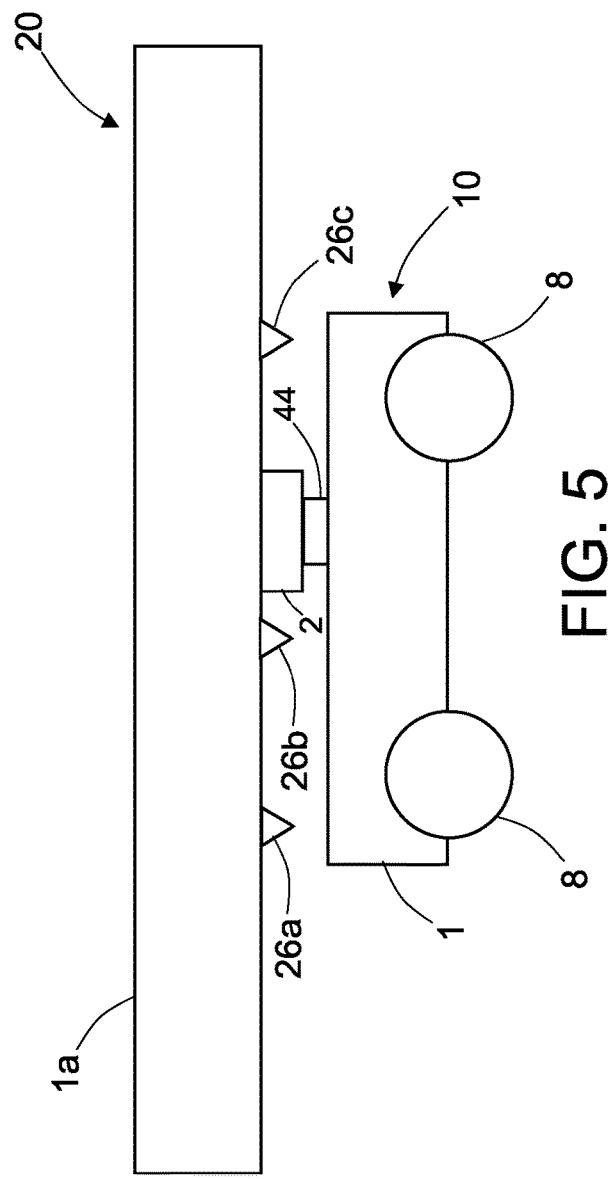

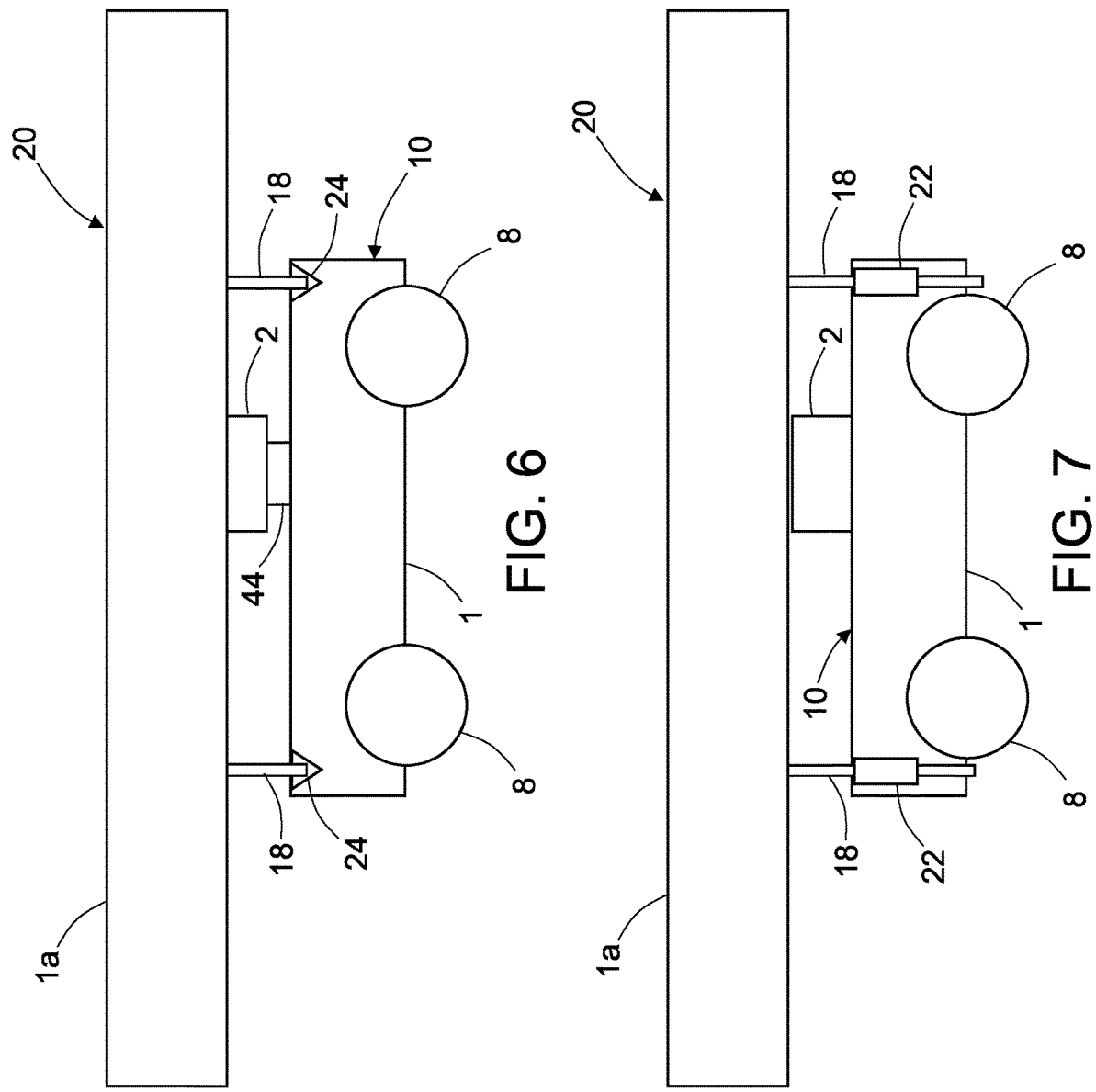

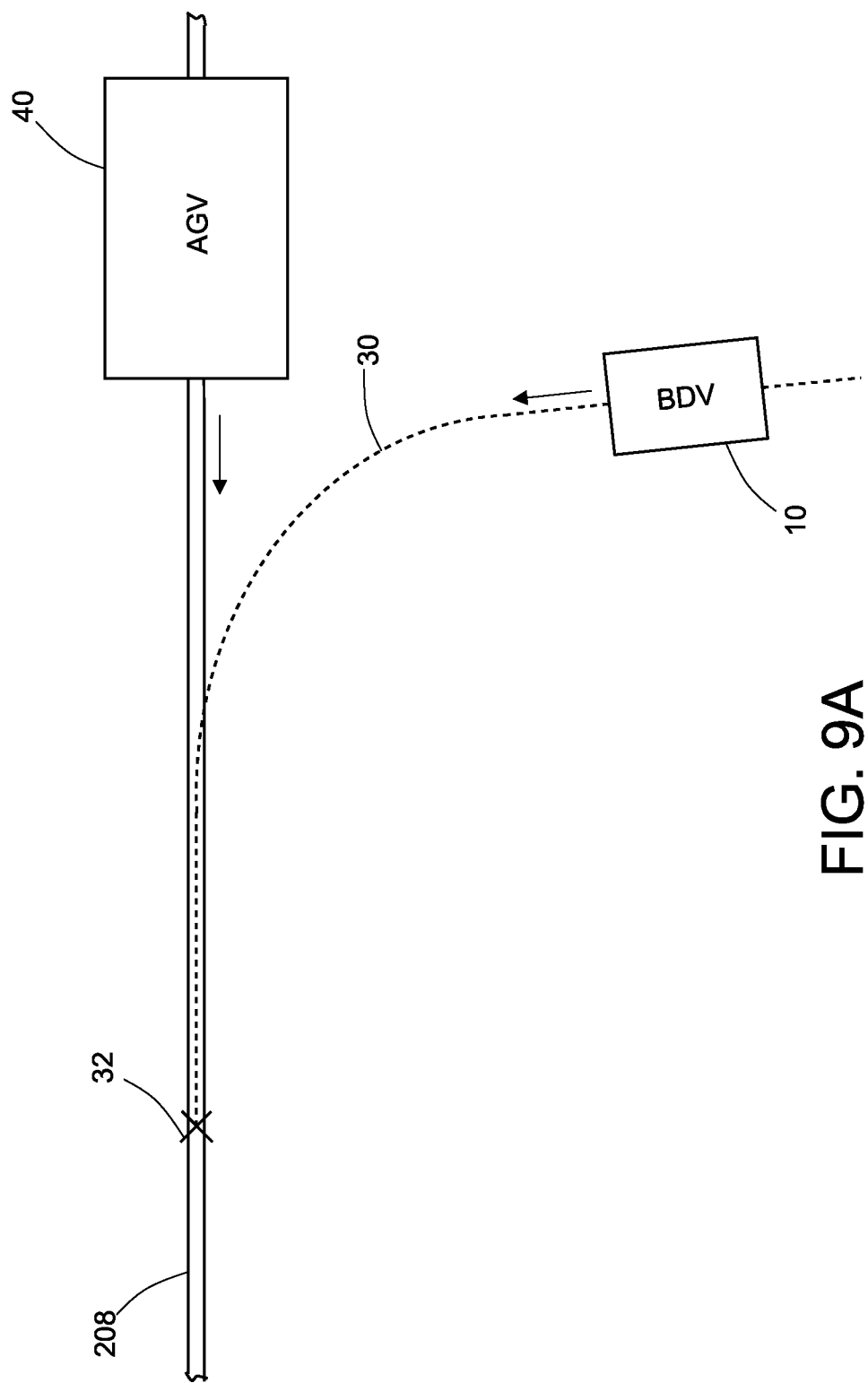

SYSTEMS AND METHODS FOR AUTOMATED IN-SITU SWAPPING OF BATTERIES FOR ELECTRIC VEHICLES

RELATED PATENT APPLICATION

This application claims the benefit, under Title 35, United States Code, Section 119(e), of U.S. Provisional Application No. 63/133,763 filed on Jan. 4, 2021.

BACKGROUND

This disclosure generally relates to systems and methods for automated swapping (exchange) of batteries or battery packs in an electric vehicle. In particular, this disclosure relates to systems and methods for automatically substituting a charged battery for a depleted battery in an electric vehicle, such as an automated guided vehicle or other electric vehicle powered solely by batteries.

As used herein, the term "depleted", as applied to a battery, means that the state of charge of the battery is lower than a first specified threshold, but not necessarily zero. As used herein, the term "charged", as applied to a battery, means that the state of charge of the battery is higher than a second specified threshold, but not necessarily 100%, wherein the second specified threshold is higher than the first specified threshold. As used herein, the term "state of charge" means the present battery capacity as a percentage of maximum capacity. The term "capacity" means the coulometric capacity, the total Amp-hours available when the battery is discharged at a certain discharge current (specified as a C-rate) from 100% state of charge to the cut-off voltage. The cut-off voltage is the minimum allowable voltage that generally defines the "empty" state of the battery.

Automated guided vehicles (AGV) typically utilize one or more batteries to provide DC power to a DC-to-AC converter that outputs AC power to AC motors which drive the vehicle movements. At various times, the batteries are either recharged or replaced. For example, when an AGV runs out of battery power, or is close to doing so, the operation being performed must be halted or aborted, which causes lost work time and leads to an increase in non-value added time in the production system. When the AGV is used in a production environment, it is desirable to maintain the AGV in service as much as practicable.

There are a few existing solutions, but none that fully solve this problem. One solution is that the production system has multiple, redundant AGVs. This allows one AGV with charged batteries to take over the function of another AGV with depleted batteries while the latter AGV is moved to a charging location to recharge. The biggest problem with this is the large capital expense required to maintain such a system. A system with multiple, redundant AGVs may require two to four times the number of AGVs to perform this maneuver consistently, which is not economically feasible. Another solution is to accept the downtime and take the AGV out of service for multiple hours to recharge its battery. This leads to a significant amount of lost work time, which would adversely affect any manufacturing system. A further solution is to find a way to replace depleted batteries with more highly (e.g., fully) charged batteries. However, typically the batteries are too heavy for a human to lift, which eliminates a quick and easy change. The AGV is typically driven to a special area where a crane, or crane-like device, is used to swap the batteries. While not creating as much non-value added time, the travel time back and forth to the special area has a negative impact on the productivity of the production system.

SUMMARY

The subject matter disclosed herein is directed to systems and methods for automated swapping of a charged replacement battery for a depleted battery onboard an electric vehicle using a battery delivery vehicle (BDV) to deliver the replacement battery and retrieve a depleted battery. Optionally, the battery delivery vehicle is also an electric vehicle powered by batteries. The BDV may be configured to operate autonomously under the control of an onboard computer or under remote control by a computer located at an operations center. The electric vehicle which receives the replacement battery from a BDV may be configured to operate autonomously (e.g., an AGV) or non-autonomously (e.g., an electric passenger car). For the sake of illustration, systems and methods for automatically swapping batteries with an AGV are described in detail below.

In accordance with some embodiments, the BDV is a wheeled battery-powered electric vehicle that is not constrained to travel along a fixed path, whereas the AGV is a battery-powered electric vehicle configured to travel on wheels or on continuous tracks along a fixed path. The systems disclosed herein allow for in-situ exchange of the AGV batteries without affecting the current task of the AGV and without creating non-value added time in the production system. The technology proposed herein solves the problem of keeping AGVs charged and performing their work function at all times. The AGV systems proposed herein have common features that enable the system operator to effectively keep AGVs in operation constantly without the need to purchase multiple redundant AGVs. Each AGV system includes one or more BDVs capable of delivering replacement batteries to a fleet of AGVs.

In accordance with one embodiment of a method for battery swapping, when an AGV has a depleted battery and requires an in-situ battery swap, the AGV will send a signal to a BDV or BDV management system, summoning a BDV. A BDV is loaded with a fully (or partially) charged battery, and then moved to a rendezvous place at which the BDV is underneath the AGV. As used herein, the term "location" includes position (e.g., coordinates in a frame of reference) and orientation (e.g., an angle relative to an axis of the frame of reference). The battery exchange may be accomplished while the AGV continues to move provided that the BDV moves in tandem with the AGV.

In accordance with one proposed implementation, the AGV has a battery bay capable of holding at least two batteries. After arriving at the rendezvous place, the BDV uses a sensor array to adjust the BDV's position underneath the AGV until the replacement battery is vertically aligned with an empty space in the battery bay which is reserved for a battery. The AGV and BDV move in tandem while the replacement battery is transferred from the BDV to the AGV, e.g., lifted into the battery bay. The BDV and AGV perform a "handshake" communication which signals to the AGV controller that the replacement battery is in proper position in the battery bay, following which the AGV controller issues commands that cause a battery holder onboard the AGV to hold the replacement battery. After the replacement battery has been installed, the power distribution system onboard the AGV switches over to draw DC power from the replacement battery (instead of from a depleted battery) without interrupting AGV operation.

In accordance with one proposed implementation, after delivering the battery, the BDV moves to a location where the empty battery support platform or empty battery holder onboard the BDV is aligned with a depleted battery onboard the AGV. The BDV and AGV perform a "handshake" communication which signals to the AGV controller that the BDV is properly in place (i.e., the empty battery support platform or empty battery holder of the BDV is vertically aligned with the depleted battery), following which the AGV controller issues commands that cause a battery holder onboard the AGV to release the depleted battery. The depleted battery is then transferred to the BDV. The depleted battery-carrying BDV then returns to the battery charging area, where the depleted battery will be recharged.

In accordance with one potential application, the proposed battery swapping methodology is employed in an AGV system that includes a plurality of AGVs, at least one BDV, and a control system. The control system is configured to identify when an AGV battery needs replacement and initiate the BDV to replace the battery while the AGV continues to move. The AGV includes a battery bay that is capable of holding at least two batteries in respective compartments. In the exemplary embodiment, one of the battery compartments remains empty to enable a recharged battery to be installed at any time. More specifically, during operation when the AGV battery charge becomes low, the control system summons the BDV to provide a replacement battery. To accomplish a mission, the BDV is moved along a travel path at a speed which is calculated to ensure that the BDV and AGV arrive at a rendezvous place at the same time.

Although various embodiments of systems and methods for automated in-situ swapping of batteries for electric vehicles will be described in some detail below, one or more of those embodiments may be characterized by one or more of the following aspects.

One aspect of the subject matter disclosed in detail below is a method for installing a battery on an electric vehicle, the method comprising: (a) charging a first battery; (b) placing a first battery onboard a battery delivery vehicle; (c) moving the battery delivery vehicle to a rendezvous place whereat the battery delivery vehicle is underneath an electric vehicle; (d) moving the battery delivery vehicle relative to the electric vehicle until the first battery is vertically aligned with an empty space in a battery bay of the electric vehicle where a first battery holder is capable, when activated, of holding the first battery; (e) raising the first battery until the first battery occupies the empty space; and (f) activating the first battery holder to hold the first battery, wherein steps (c) through (f) are performed under computer control.

In accordance with some embodiments, the method described in the immediately preceding paragraph further comprises: (g) supplying DC power from the first battery to a DC power bus onboard the electric vehicle subsequent to step (f); (h) disconnecting a second battery from the DC power bus subsequent to step (g), the second battery being held in the battery bay by a second battery holder; (i) activating the second battery holder to release the second battery subsequent to step (h); and (j) lowering the released second battery out of the battery bay subsequent to step (i).

In accordance with one proposed implementation, the electric vehicle is an automated guided vehicle, and the method further comprises: (k) moving the automated guided vehicle to the rendezvous place during step (c); and (l) moving the battery delivery vehicle and the automated guided vehicle at a same speed along a common travel path during step (e). Also, step (d) comprises: (k) acquiring sensor data representing a current location of the battery delivery vehicle in a frame of reference of the electric vehicle; (l) calculating a simulated deviation of the current location from a target location at which the first battery is aligned with the empty space in the battery bay based on the sensor data; and (m) moving the battery delivery vehicle relative to the electric vehicle to decrease the actual deviation, wherein steps (k) through (m) are iteratively performed until the simulated deviation calculated in step (l) is less than a specified threshold.

Another aspect of the subject matter disclosed in detail below is a system comprising an electric vehicle and a battery delivery vehicle disposed underneath and mechanically coupled to the electric vehicle so that the electric vehicle and battery delivery vehicle are movable in tandem. The electric vehicle comprises a frame having a battery bay and a battery holder disposed in the battery bay. The battery delivery vehicle comprises a frame that supports a battery which is disposed underneath and aligned with the battery holder.

A further aspect of the subject matter disclosed in detail below is a battery delivery vehicle comprising: a frame; a battery lifting mechanism mounted to the frame; a lift motor operatively coupled to the battery lifting mechanism; a plurality of wheels rotatably mounted to the frame; a plurality of wheel motors equal in number to the number of wheels, each wheel motor being operable to drive rotation of a respective one of the wheels; a plurality of sensors installed on said frame and configured to acquire sensor data representing relative location information from a surface overlying the frame; and a controller programmed to independently control the plurality of motors to perform operations comprising: controlling the wheel motors to move the frame to a location where the battery lifting mechanism is vertically aligned with a battery destination; and controlling the lift motor to extend the battery lifting mechanism so that a battery supported by the battery lifting mechanism is raised to the battery destination.

Yet another aspect of the subject matter disclosed in detail below is an electric vehicle comprising: a frame having a battery bay; a first battery holder disposed in the battery bay; a hold motor operatively coupled to the first battery holder; a first battery held by the first battery holder; a plurality of wheels rotatably mounted to the frame; a plurality of wheel motors equal in number to the number of wheels, each wheel motor being operable to drive rotation of a respective one of the wheels; a pair of spring-loaded electrical connector mechanisms (e.g., pogo pins) which are in contact with respective terminals of the first battery; and a controller programmed to independently control the plurality of motors to perform operations comprising: controlling the wheel motors to move the frame forward; and controlling the hold motor to open the first battery holder while the frame is moving forward.

In accordance with some embodiments, the electric vehicle described in the immediately preceding paragraph further comprises: a second battery holder disposed in the battery bay; a sensor in the battery bay which detects a change of state of the second battery holder from an empty state to a state in which the second battery holder is holding a second battery; a DC power bus; a first contactor which connects the DC power bus to the first battery when the first contactor is closed and disconnects the DC power bus from the first battery when the first contactor is opened; a second contactor which connects the DC power bus to the second battery when the second contactor is closed and disconnects the DC power bus from the second battery when the second contactor is opened; and a battery management system configured to close the second contactor and open the first contactor in response to a signal from the sensor indicating that the change of state of the second battery holder has occurred.

Other aspects of systems and methods for automated in-situ swapping of batteries for electric vehicles are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIGS. 3A and 3B are diagrams representing side and top views respectively of a BDV in accordance with one embodiment.

FIG. 4 is a diagram representing a side view of a BDV underneath an electric vehicle.

FIG. 5 is a diagram representing a side view of a BDV which has been aligned with an electric vehicle using beacons mounted underneath the electric vehicle in accordance with one embodiment.

FIG. 6 is a diagram representing a side view of a BDV which has been aligned with an electric vehicle using alignment rods in accordance with another embodiment.

FIG. 7 is a diagram representing a side view of a BDV which has been aligned with an electric vehicle using alignment rods and then lifted from the ground using ratchets wheels that climb the alignment rods in accordance with a further embodiment.

FIG. 9A is a diagram representing a map showing one example of respective planned paths by which the AGV and BDV arrive at a rendezvous place for the purpose of battery exchange.

Reference will hereinafter be made to the drawings in which similar elements in different drawings bear the same reference numerals.

DETAILED DESCRIPTION

Illustrative embodiments of systems and methods for automated in-situ swapping of batteries for electric vehicles are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The technology disclosed herein includes systems and methods for automated swapping of a charged replacement battery for a depleted battery onboard an electric vehicle (EV) using a battery delivery vehicle (BDV). The BDV may be configured to operate autonomously or under remote control. The electric vehicle which receives the replacement battery from the BDV may be configured to operate autonomously (e.g., an AGV) or non-autonomously (e.g., an electric passenger car). The BDV is loaded with a fully (or partially) charged battery, and then moved to a rendezvous place at which the BDV is underneath and aligned with the EV. The battery is uploaded to the EV while the aligned BDV moves in tandem with the EV. After the replacement battery has been installed, the power distribution system onboard the EV switches over to draw DC power from the replacement battery (instead of from a depleted battery) without interrupting vehicle operation.

Figure 1:
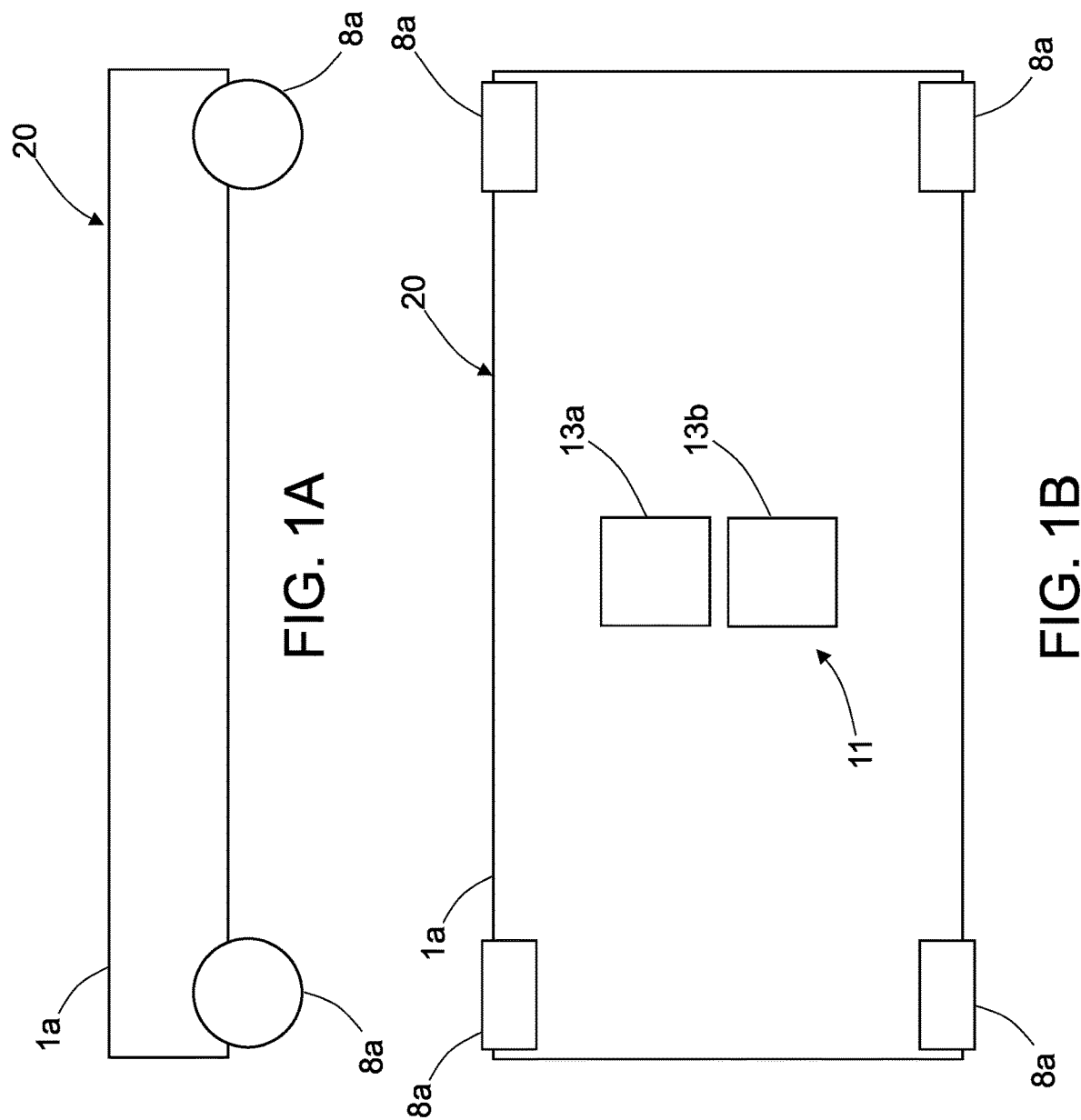
FIGS. 1A and 1B are diagrams representing side and bottom views respectively of an electric vehicle having a battery bay that can receive a delivered battery from below.

FIGS. 1A and 1B are diagrams representing side and bottom views respectively of an EV 20 having a battery bay 11 that can receive a delivered battery from below. The EV 20 depicted in FIGS. 1A and 1B includes a frame 1a and four wheels 8a. In alternative embodiments, the EV 20 may move on a pair of continuous tracks. In the EV 20 depicted in FIGS. 1A and 1B, the battery bay 11 comprises a pair of battery compartments 13a and 13b separated by a partition. In alternative embodiments, the battery bay 11 may be configured as a single compartment that contains multiple battery holders for holding more than one battery. Prior to a battery exchange, battery compartment 13a may be occupied by a depleted battery which has been identified for removal, while battery compartment 13b is empty and ready to receive a partially or fully charged battery. The undersurface of frame 1a has respective openings formed by the battery compartments 13a and 13b. A battery may be inserted into or removed from a battery compartment via such opening by means of a battery delivery vehicle which is positioned underneath the frame 1a of EV 20.

Figure 2:
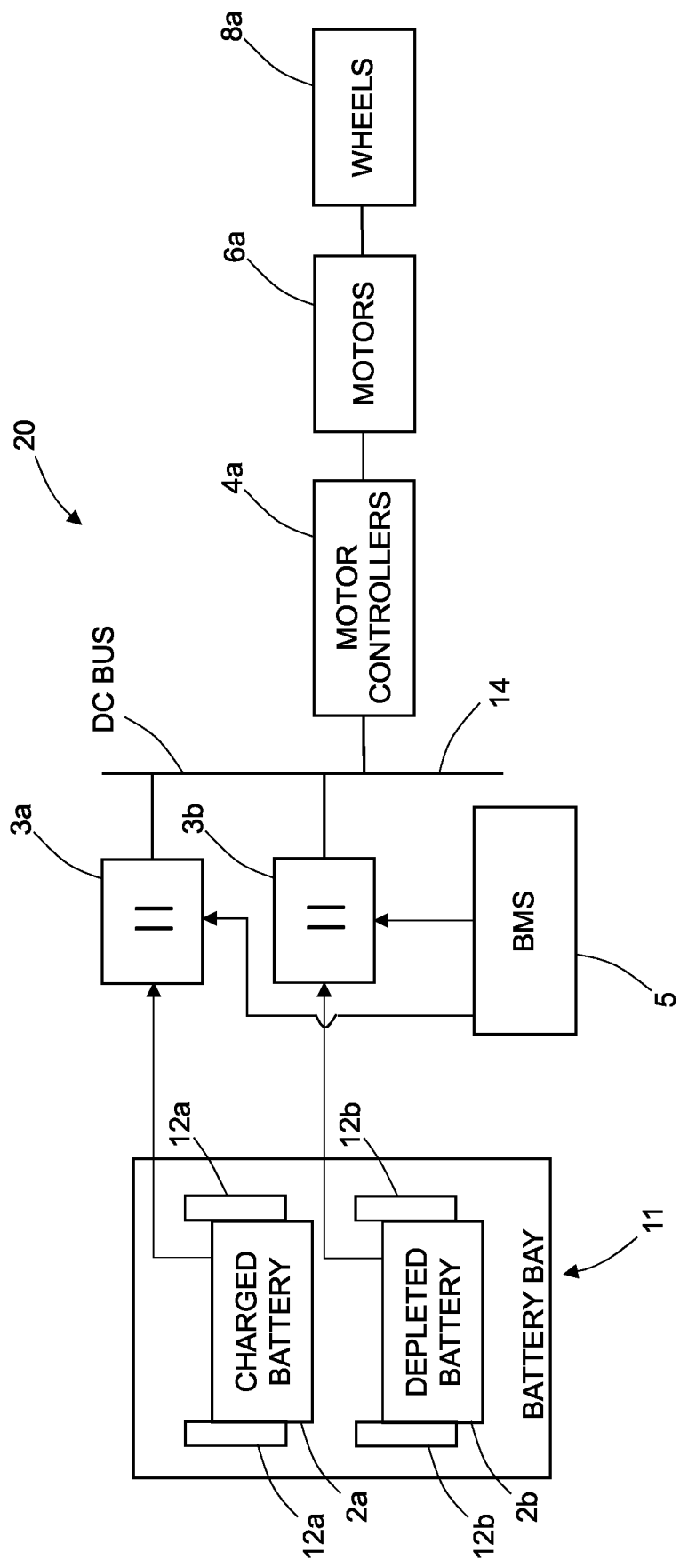
FIG. 2 is a block diagram identifying some components of an electric vehicle having a battery bay that is holding a charged battery and a depleted battery.

FIG. 2 is a block diagram identifying some components of an EV 20 having a battery bay 11 that includes a first battery holder 12a that is holding a charged battery 2a and a second battery holder 12b that is holding a depleted battery 2b. The EV 20 further includes a DC power bus 14 which receives DC power signals from the charged battery 2a when a battery contactor 3a is closed. Similarly, the DC power bus 14 receives DC power signals from the depleted battery 2b when a battery contactor 3b is closed. A contactor is an electrically controlled switch used for switching an electrical power circuit. Contactors are designed to be directly connected to high-current load devices. The switching states of the battery contactors 3a and 3b are controlled by respective circuits (not shown in FIG. 2) which have a lower power level than the switched circuits.

In addition, the EV 20 depicted in FIG. 2 includes a plurality of motor controllers 4a, a plurality of AC motors 6a respectively controlled by the motor controllers 4a, and a plurality of wheels 8a respectively driven to rotate by the AC motors 6a. Each motor controller 4a is connected to the DC power bus 14. The motor controllers 4a convert DC power from the DC power bus into AC power for the AC motors 6a. Each wheel 8a comprises an axle (not shown in FIG. 2) which is mechanically coupled to the associated AC motor 6a.

The charged battery 2a may be a battery string or pack comprising a number of cells/batteries connected in series to produce a battery with the required usable voltage/potential. The operation of the battery string is managed by a battery management system 5. The battery management system 5 may be configured to ensure redundant protections, fail safe operation, and selective shutdown of battery strings. The battery management system 5 may be further configured to provide battery overcharge protection or to forestall other events or combination of events that could lead to battery thermal runaway. More specifically, the battery management system 5 may monitor the state of a battery as represented by various parameters, such as: total voltage, voltages of individual cells, average temperature, temperatures of individual cells, state of charge (SOC) to indicate the charge level of the battery, state of health (SOH) to indicate the remaining capacity of the battery, state of power (SOP) to indicate the amount of power available for a defined time interval, and other parameters. The battery management system may also be configured to manage the battery temperature. The central controller of a battery management system communicates internally with hardware that operates at the cell level. A battery management system may protect its battery by preventing over-current (may be different in charging and discharging modes), over-voltage (during charging), under-voltage (during discharging), over-temperature, under-temperature, ground fault or leakage current detection.

FIGS. 3A and 3B are diagrams representing side and top views respectively of a BDV 10 having a pair of battery seats 17a and 17b that can support a battery to be delivered to an EV. The BDV 10 depicted in FIGS. 3A and 3B includes a frame 1 and four wheels 8. Each battery seat may be configured with a peripheral edge designed to prevent a seated battery from sliding during BDV movement. Each battery seat 17a and 17b may be mounted to a respective lifting mechanism (not shown in FIGS. 3A and 3B). When the BDV 10 is assigned a mission to exchange batteries with a particular EV, a charged battery is placed on one of the battery seats 17a or 17b. Then the BDV 10 drives to a rendezvous place with the other battery seat unoccupied. During a battery exchange with an EV, the charged battery 2a (see FIG. 2) will be removed from the occupied battery seat and then the depleted battery 2b will be placed on the unoccupied battery seat.

FIG. 4 is a diagram representing a side view of a BDV 10 underneath an EV 20. The centers of battery seats 17a and 17b on BDV 10 may be separated by a distance equal to the distance separating the centers of the battery compartments 17a and 17b in EV 20, so that the battery seats 17a and 17b can be respectively vertically aligned with the battery compartments 17a and 17b prior to a battery exchange. During the battery exchange, first the charged battery 2a is transferred from BDV 10 to EV 20; then the depleted battery 2b is transferred from EV 20 to BDV 10.

In accordance with one proposed method of automated in-situ battery swapping, the BDV 10 will approach a slow-moving EV 20 and navigate underneath the frame 1a of the EV 20. The BDV 10 then uses a sensor array to acquire relative location information which is used to adjust the BDV's position underneath the EV 20 until the replacement battery is vertically aligned with an empty space in the battery bay 11. The location processing system enables the BDV 10 to position itself to within 5 cm of the correct position underneath the EV 20. In particular, for EVs (such as AGVs) which operate at a low speed (1-3 mph), the BDV 10 is able to maneuver precisely relative to the EV 20 without difficulty.

The location information may be obtained by detecting transmitted radiation from a plurality of Bluetooth low-energy beacons which are mounted to the undersurface of the EV 20. Bluetooth beacons are hardware transmitters that broadcast a universally unique identifier picked up by a compatible app or operating system. The identifier and several bytes sent with it can be used to determine the receiving device's physical location.

In the alternative, the location information may be obtained by detecting transmitted radiation from a plurality of radiofrequency identification (RFID) tags mounted to the undersurface of the EV 20. Impulse-radio ultra-wideband (IR-UWB) technology may be used in cluttered indoor environments. The RFID tag is a transmitter comprising a micro-controller board and a UWB impulse radio board. The transmitted pulse is captured by low-cost energy-detection receivers mounted to the BDV 10.

FIG. 5 is a diagram representing a side view of a BDV 10 that is carrying a battery 2 on top of a lifting mechanism 44. The BDV 10 is shown in a state of alignment with an EV 20. In accordance with one embodiment, alignment is achieved using three beacons 26a-26c mounted underneath the frame 1a of EV 20. The BDV 10 is equipped with a sensor suite that detects the signals transmitted by the beacons 26a-26c. The detected signals are then processed by a computer to calculate the current location (position and orientation) of the BDV 10 in the frame of reference of the EV 20 by means of triangulation. The computer is configured to also calculate a simulated deviation of the current location from a target location at which the charged battery 2a is aligned with the empty space in the battery bay 11. The simulated deviation calculation is based on sensor data derived from the detected signals. In response to the latest simulated deviation calculation, the BDV 10 is moved relative to the EV 20 to decrease the actual deviation. These steps are iteratively performed until the simulated deviation is less than a specified threshold that represents a degree of vertical alignment within an engineering tolerance.

Following vertical alignment of the battery 2 carried by BDV 10 with an empty battery compartment 13a in the EV 20, the BDV 10 uses the built-in lifting mechanism 44 to lift the battery 2 into the compartment with which the battery is vertically aligned. (The battery 2 is shown only partially inserted in FIG. 5.) Once the battery 2 has been fully inserted into the compartment, a set of spring-loaded electrical connector mechanisms contact the battery terminals, which allows a latching system to be powered and locked around the battery 2. The EV 20 then sends a signal to the BDV 10 (handshake operation) to confirm receipt of battery 2. Thereafter, a depleted battery in the battery bay 11 of EV 20 may be unlatched by opening a battery holder, following which the depleted battery is supported entirely by an unoccupied battery seat on top of a second lifting mechanism (not shown in FIG. 5) of BDV 10. The second lifting mechanism is lowered to transfer the depleted battery from the battery bay of EV 20 to the BDV 10 for transport to the battery charging station.

FIG. 6 is a diagram representing a side view of a BDV 10 which has been aligned with an EV 20 using alignment rods 18 in accordance with another embodiment. This alignment method uses a sensor suite to approximately locate the BDV 10. Alignment rods 18 are then lowered from the EV 20 toward respective conical guide holes 24 formed in frame 1 of BDV 10. The tips of alignment rods 18 interface with conical guide holes 24 to precisely locate the BDV 10 underneath the EV 20. More specifically, the battery 2 is vertically aligned with an empty battery compartment of the EV 20 as the tapered surfaces of the conical guide holes 24 interact with the tips of alignment rods 18 to cam the BDV 10 into a precisely aligned position. This physical alignment allows the BDV 10 to then use a built-in lifting mechanism 44 to lift the battery 2 into the compartment. Once the battery 2 makes contact with the compartment, a set of spring-loaded electrical connector mechanisms (not shown in FIG. 6, but see spring-loaded electrical connector mechanism 60 in FIG. 23) in the battery compartment come into contact with the battery terminals, which allows a latching system (not shown in FIG. 6) of the EV 20 to be powered, thereby holding the battery 2 against the spring-loaded electrical connector mechanisms. This in turn establishes an electrical connection between the charged battery 2a and battery contactor 3a seen in FIG. 2. In an alternative embodiment, the conical guide holes 24 may be incorporated in frame 1a of EV 20 while the alignment rods 18 are mounted to frame 1 of BDV 10 in a manner that allows vertical translation of the rods. After the battery 2 has been transferred to the EV 20 and while the tips of alignment rods 18 still interface with the conical guide holes 24, a depleted battery may be removed from the electric vehicle battery bay and transferred to the BDV 10 in the manner previously described.

FIG. 7 is a diagram representing a side view of a BDV 10 which has been aligned with an EV using alignment rods 18 and then lifted from the ground using ratcheting mechanisms 22 that climb the alignment rods 18 in accordance with a further embodiment. This alignment method uses a sensor suite to approximately locate the BDV 10. The alignment rods 18 are then lowered from the EV 20 toward respective holes formed in frame 1 of BDV 10. The alignment rods 18 interface with the holes to precisely locate the BDV 10 underneath the EV 20. This physical alignment allows the BDV 10 to then activate the ratcheting mechanisms 22 to lift the BDV 10 off the ground. As the BDV 10 rises towards the EV 20, the battery 2 is delivered into the empty battery compartment and into contact with the spring-loaded electrical connector mechanisms, as previously described. During the battery exchange procedure, the BDV 10 is carried by the EV 20, which continues to move in accordance with its present task or mission.

Figure 8:
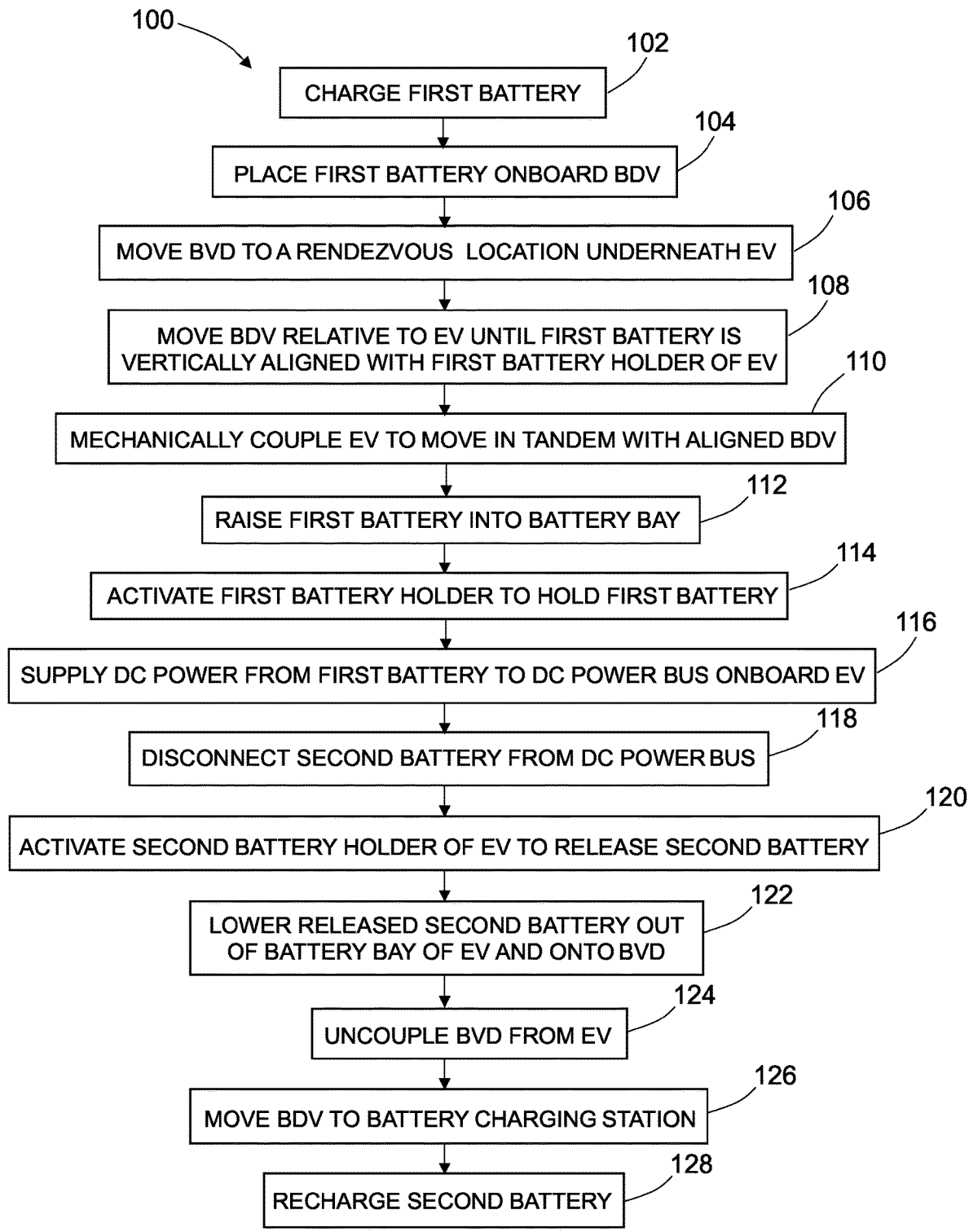
FIG. 8 is a flowchart identifying steps of a method for automated in-situ swapping of batteries in accordance with one embodiment.

FIG. 8 is a flowchart identifying steps of a method 100 for automated in-situ swapping of batteries in accordance with one embodiment. A first battery is charged at a battery charging station (step 102). After charging to a desired level, the first battery is placed on a battery seat on a frame of a BDV (step 104). The BDV then moves to a rendezvous place at which the BDV is underneath the EV (step 106). Then the BDV moves relative to the EV until the first battery is vertically aligned with a first battery holder of the EV (step 108). While vertically aligned, the BDV and the EV are mechanically coupled to move in tandem (step 110). During concurrent vertical alignment and mechanical coupling, the first battery is raised into the battery bay of the EV (step 112). When the first battery is in proper position, the first battery holder is activated to hold the first battery (step 114). Then a contactor is closed to electrically connect the first battery to a DC power bus onboard the EV (step 116).

Connection of the first battery is followed by disconnection of a second battery from the DC power bus on board the EV (step 118). Then a second battery holder of the EV is activated to release the second battery (step 120). The released second battery is lowered out of the battery bay and onto the BDV (step 122). Once the BDV is carrying the second battery, the BDV is uncoupled from the EV (step 124). The BDV is then free to move to the battery charging station (step 126). At the battery charging station, the second battery is then recharged to a specified level.

In accordance with one proposed implementation of the method depicted in FIG. 8, step 108 comprises the following steps: (a) acquiring sensor data representing a current location of the BDV in a frame of reference of the EV; (b) calculating a simulated deviation of the current location from a target location at which the first battery is aligned with the empty space in the battery bay based on the sensor data; and (c) moving the battery delivery vehicle relative to the EV to decrease the actual deviation. Steps (a) through (c) are iteratively performed until the simulated deviation calculated in step (b) is less than a specified threshold.

The operational principles and mechanisms disclosed herein have numerous benefits when applied to automated guided vehicles (AGVs). The systems proposed herein allow a BDV to deliver charged batteries to AGVs without downtime for the AGV. Optionally, the BDV could also be a secondary automated guided vehicle used to deliver a new battery, install it, and then remove the depleted battery.

A secondary benefit of the proposed systems is that the life of the batteries can be extended. When a battery is charged to 100% consistently, the health of the battery deteriorates. Due to the lengthy process to replace a battery which is presently prevalent, the batteries are almost always topped off to 100%. With a system that can seamlessly exchange batteries when needed, the batteries could be charged to a healthier 80% before being used. This leads to more battery exchanges by the BDV, but allows the batteries to have a much longer useful life, therefore avoiding the more frequent purchase of replacement batteries.

Automated guided vehicles (AGVs) may be used to perform different types of operations. For example, these types of vehicles may be used for towing objects, carrying loads, transporting materials, performing forklift operations, and/or performing other suitable types of operations. Typically, the path for an AGV is formed in or on the ground over which the AGV will move. As one illustrative example, a path may be formed by cutting a slot into the floor of a facility and embedding an electrically conductive wire in this slot. The AGV uses a sensor to detect a radiofrequency signal transmitted from the wire. The AGV uses this detected radiofrequency signal to follow the wire embedded in the floor. In the alternative, a magnetic bar may be embedded in the slot. In another illustrative example, a path is formed by placing tape on the ground. The tape may be, for example, without limitation, colored tape or magnetic tape. An AGV may use any number of sensors to follow the path formed by the tape. Some currently available AGVs use laser systems and/or three-dimensional imaging systems to follow predefined paths.

Figure 9:
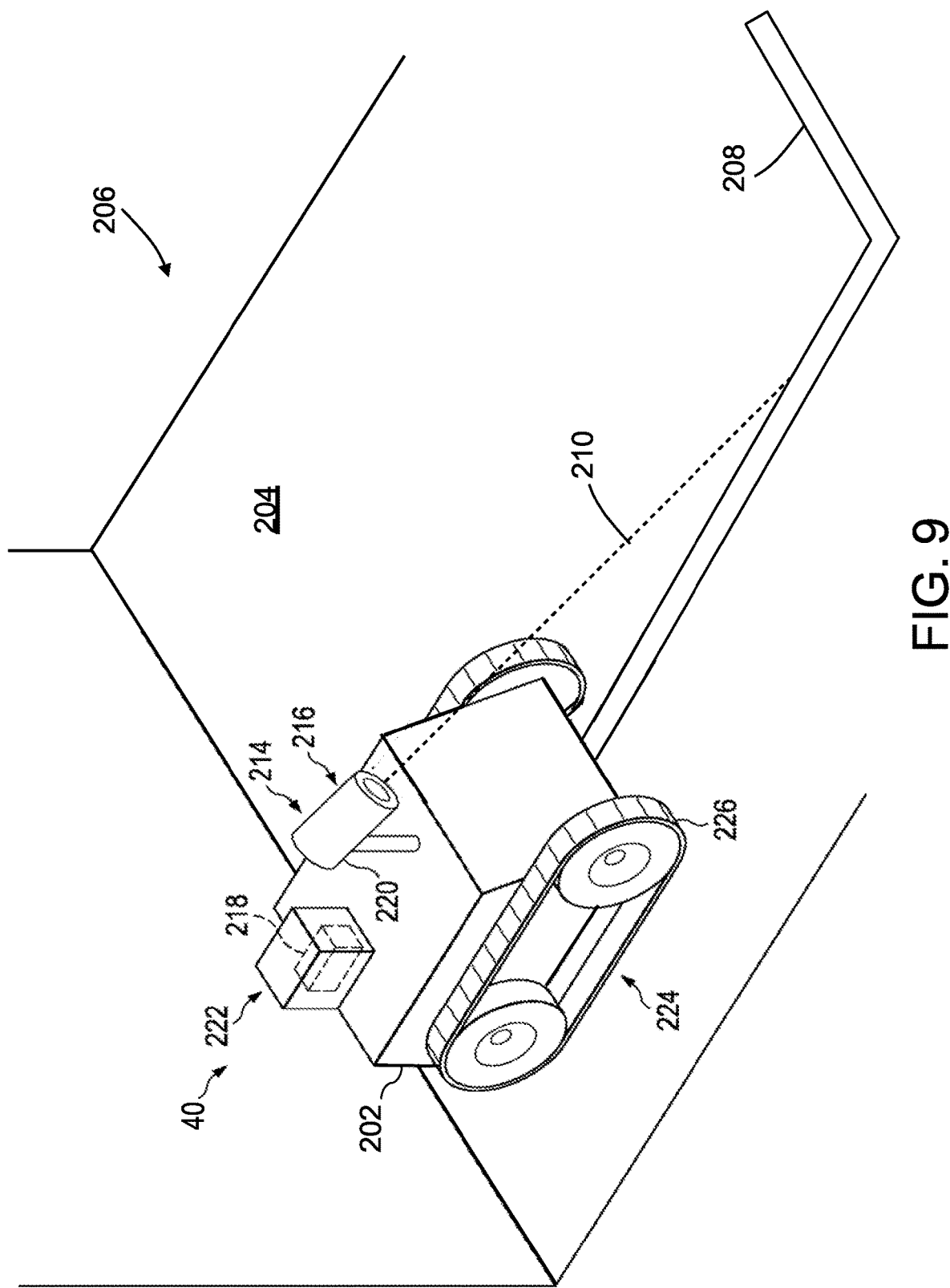
FIG. 9 is a diagram representing a three-dimensional (3-D) view of an AGV equipped with a guidance unit.

FIG. 9 is a diagram representing a three-dimensional (3-D) view of an AGV 40 having a guidance unit 214 mounted to the body 202 of AGV 40. The AGV 40 is configured to move on the ground 204 in a manufacturing facility 206. In this illustrative example, magnetic bar 208 is embedded in the ground 204. The AGV 40 in turn is equipped with magnetic sensors that detect the presence of the magnetic bar 208. The magnetic bar 208 defines a path on the ground 204 along which the AGV 40 is to move. In this illustrative example, the AGV 40 has a guidance unit 214. The guidance unit 214 is configured to control and guide movement of the AGV 40. As depicted, the guidance unit 214 includes a sensor system 216 and a motion controller 218. For example, the sensor system 216 may comprise one or more laser range meters that scan for the presence of obstacles in the path of the AGV 40. A typical laser range meter comprises a laser diode which transmits a laser beam 210 (indicated by a dashed line in FIG. 9).

As depicted in FIG. 9, the motion controller 218 is implemented in a control system 222 onboard the AGV 40. In particular, this control system 222 may take the form of a computer or a processor. The motion controller 218 is configured to guide the AGV 40 along the path defined by the magnetic bar 208. In particular, the motion controller 218 is configured to process the data from the sensor system 216. For example, in response to receiving sensor data representing an AGV—obstacle separation distance less than a specified threshold, the motion controller 218 may issue a command instructing the AGV 40 to stop or slow down. The motion controller 218 sends the commands to propulsion drive system 224 of the AGV 40. In this illustrative example, the propulsion drive system 224 is an endless track system 226. The propulsion drive system 224 moves the AGV 40 based on the commands received from the motion controller 218.

FIG. 9A is a diagram representing a map showing one example of respective planned paths by which the AGV 40 and BDV 10 arrive at a rendezvous place 32 (indicated by X) for the purpose of battery exchange. In this example scenario, the AGV 40 is moving at a pre-rendezvous instant in time along a magnetic bar 208 that defines a path on the ground. The AGV 40 shown in FIG. 9A is moving toward rendezvous place 32 (in the direction indicated by an arrow) and is expected to arrive there at a known future time (hereinafter "rendezvous time"). The BDV 10 is shown traveling along a path 30 (indicated by a dashed line) at the same pre-rendezvous instant in time. The trajectory of BDV 10 is calculated using an algorithm that is configured to ensure that the path 30 intersects rendezvous place 32 and that the BDV 10 arrives at rendezvous place 32 at the rendezvous time. The BDV 10 is designed so that BDV 10 will fit underneath AGV 40 when both vehicles are at the rendezvous place 32 at the rendezvous time, as previously described with reference to FIG. 4. Post-rendezvous, the BDV 10 initially moves in tandem with AGV 40 along the fixed path, but soon thereafter moves in the manner previously described to adjust its location in the frame of reference of the AGV 40. The adjustments are made iteratively until the charged battery being carried by BDV 10 is vertically aligned with an empty space (e.g., an empty battery compartment) in the battery bay of AGV 40 which is reserved for the charged battery being delivered.

Figure 10:
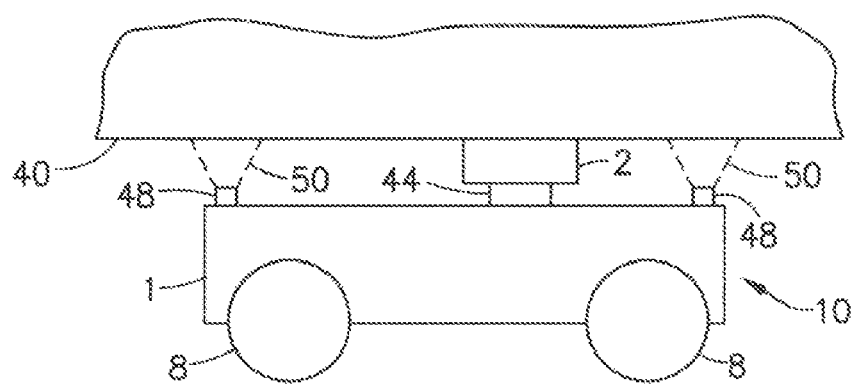
FIG. 10 is a diagram representing a side view of a BDV which has been aligned with an AGV using cameras and markers in accordance with another embodiment.

FIG. 10 is a diagram representing a side view of a BDV 10 which has been vertically aligned with an AGV 40 using cameras 48 mounted to BDV 10 and markers (not shown in FIG. 10) applied to the undersurface of AGV 40 in accordance with another embodiment. The cameras 48 have respective fields of view 508 which are fixed in the frame of reference of BDV 10. The markers are fixed in the frame of reference of AGV 40. During the vertical alignment operation, the cameras 48 capture images of the markers. If the cameras 48 are visible light cameras, then light sources for illuminating the shadowed space underneath AGV 40 may be mounted to either BDV 10 or AGV 40. In an alternative implementation, infrared cameras may be employed. In an alternative embodiment, the cameras may be mounted to AGV 40 while the markers are applied to the upper surface of BDV 10.

In accordance with some embodiments, cameras mounted to one vehicle and markers affixed to the other vehicle are employed to detect the location of BDV 10 relative to (in the frame of reference of) AGV 40. The markers may be any suitable optical (visual) target, such as code pattern markers. In one proposed implementation, the AGV 40 has a plurality of code pattern markers disposed on an undersurface of the frame. Each code pattern marker has a code pattern indicating a respective location of the code pattern marker in the frame of reference of AGV 40. In the same proposed implementation, the BDV 10 includes a plurality of cameras having respective focal axes which intersect the undersurface of the AGV frame and a computer configured to control movement of BDV 10 to align battery 2 with a battery holder prior to mechanical coupling to AGV 40 in dependence on the code patterns of any code pattern markers within fields of view of the plurality of cameras.

The code payload in each code pattern marker includes the coordinate position of the marker in the frame of reference of AGV 40. The cameras 48 acquire images of the environment, including any code pattern markers within their fields of view 50. An image processing server (not shown in FIG. 10) is configured to read and decode the AGV codes printed on the code pattern markers and then a location processing server calculates the location of BDV 10 relative to the AGV 40 based on the image data from the image processing server. The servers may be located onboard or off board the BDV 10.

One example of a suitable commercially available code pattern is a QR code. QR codes are a type of two-dimensional barcode (a.k.a. matrix barcode) which have integrated registration fiducial symbols (a.k.a. registration marks). The pixel positions of the fiducial symbols in the images captured by cameras 48 enable the location processing server to iteratively calculate the absolute coordinates of the location of BDV 10 in the frame of reference of AGV until the absolute coordinates indicate that the charged battery is vertically aligned with an empty battery compartment within a specified engineering tolerance.

The calculations to ensure proper alignment and relative motion could be handled by a core computer in the building in which the vehicles are moving over a wireless network, within the AGV 40, or within the BDV 10. In accordance with one proposed implementation, a computer onboard AGV 40 takes over control of the BDV 10 when BDV 10 gets within range so that BDV 10 is aware of any upcoming AGV movements, without having to only be reactive to the AGV 40.

Figure 11:
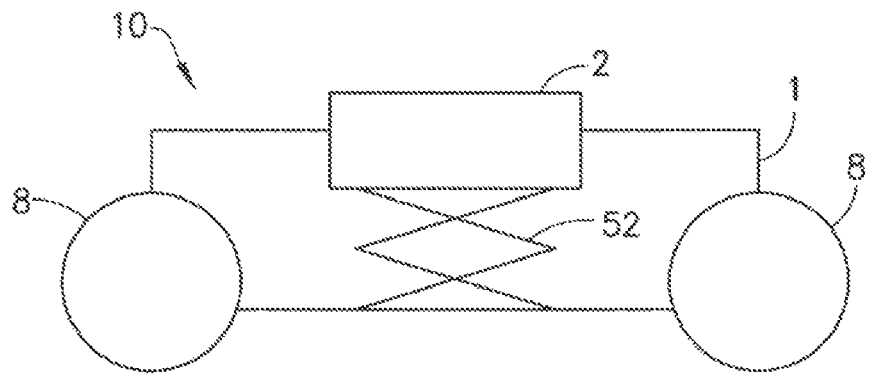
FIG. 11 is a diagram representing a side view of a BDV which has a scissor-lift device for raising and inserting a battery into a battery bay which is accessible underneath an AGV.
Figure 12:
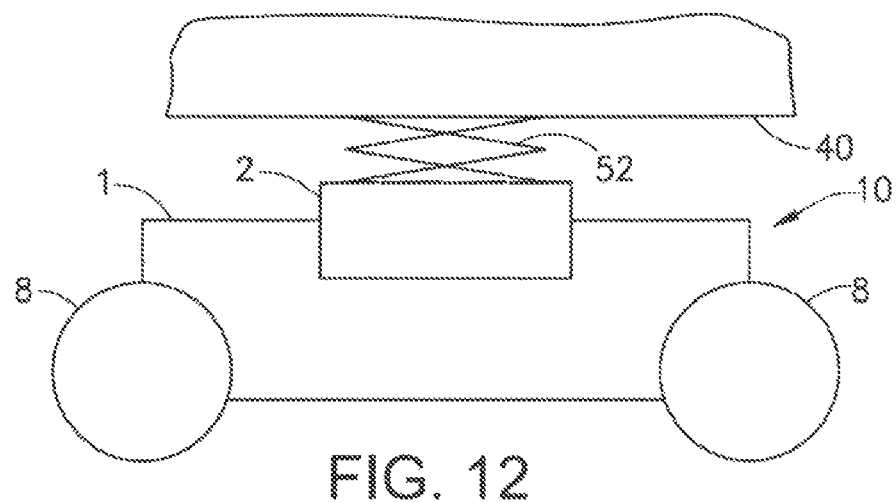
FIG. 12 is a diagram representing a side view of an AGV which has a scissor-lift device for raising and inserting a battery carried by a BDV into a battery bay which is accessible underneath the AGV.

FIGS. 11 through 15 show various mechanisms for lifting a charged battery that is being carried by a BDV 10. In the embodiments depicted in FIGS. 11 and 12, the battery 2 is lifted while the BDV 10 and AGV 40 remain on the ground. FIG. 11 shows a side view of a BDV 10 which has a scissor-lift device 52 for raising and inserting a battery 2 into a battery bay (not shown in FIG. 11) which is accessible underneath an AGV. Scissor-lift devices typically include one or more sets of inter-tied scissors or a scissor stack operated by a hydraulic cylinder on a motor-driven base. FIG. 12 shows a side view of an AGV 40 which has a scissor-lift device 52 for raising and inserting a battery 2 carried by BDV 10 into a battery bay which is accessible underneath the AGV 40. Incorporating the scissor-lift device 52 into the AGV 40 has the advantage that the height of BDV 10 may be reduced in situations where the height of the AGV's undersurface above ground is low.

Figure 13:
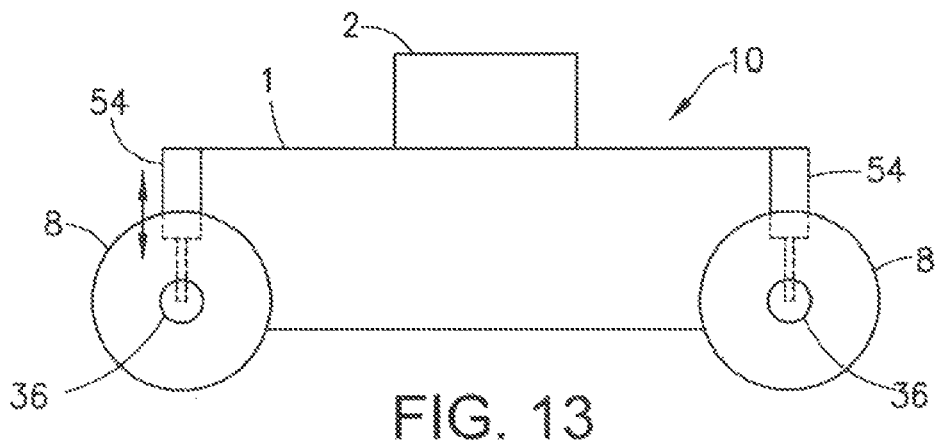
FIG. 13 is a diagram representing a side view of a BDV which has a plurality of cylinders capable of raising the frame of the BDV and the battery which is supported by the frame.

In the embodiment depicted in FIG. 13, both the frame 1 of BDV 10 and the battery 2 are lifted while the AGV 40 and the wheels 8 of BDV 10 remain on the ground. FIG. 13 shows a side view of a BDV 10 which has a plurality (e.g., four) of cylinders 54 capable of raising the frame 1 of BDV 10 relative to the wheels 8 on the ground, thereby raising the battery 2 which is supported by the frame 1. The cylinders 54, which may be hydraulic or pneumatic, include piston rods attached to axles 36. The piston rods are extended by a distance which is sufficient to displace the battery vertically upward into contact with spring-loaded electrical connector mechanisms inside the battery bay of the AGV 40. Conversely, the piston rods may be retracted when a depleted battery is being removed from the battery bay of AGV 40.

Figure 14:
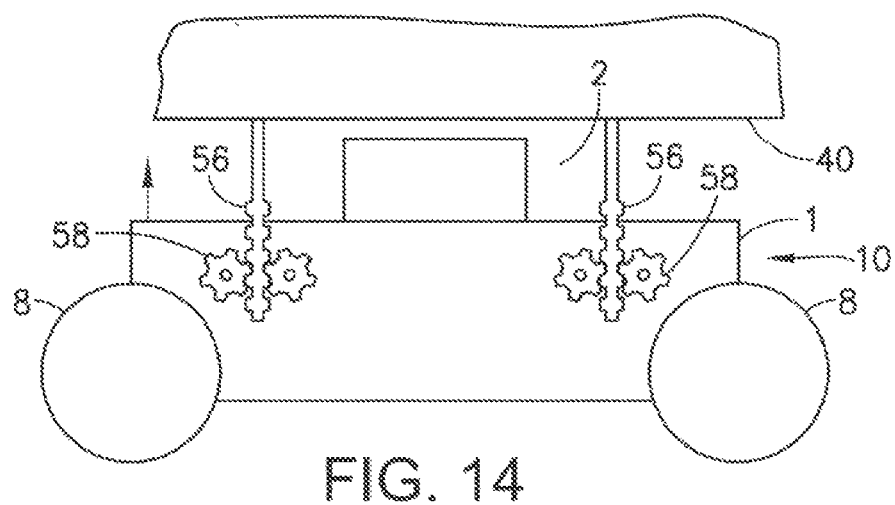
FIG. 14 is a diagram representing a side view of a BDV which is equipped with sets of pinion gears capable of climbing up respective racks depending from an AGV in order to lift the battery being carried by the BDV into a battery bay of the AGV.
Figure 15:
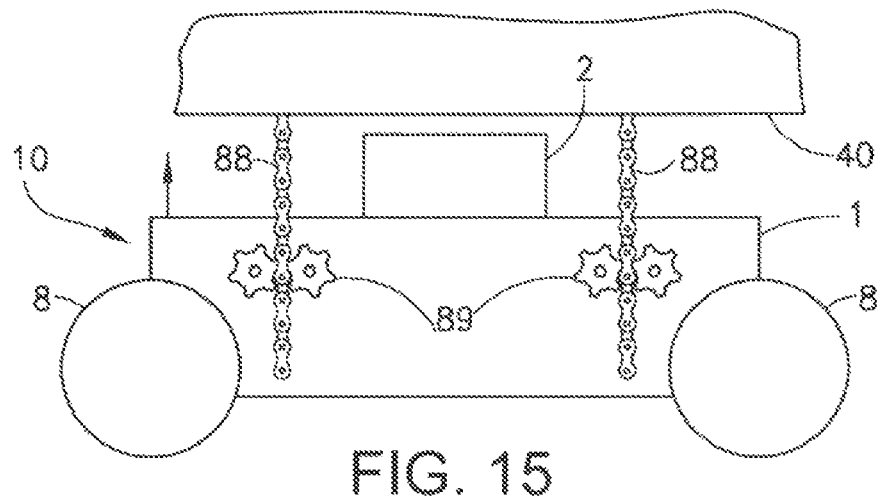
FIG. 15 is a diagram representing a side view of a BDV which is equipped with sets of sprocket wheels capable of climbing up respective chains depending from an AGV in order to lift the battery being carried by the BDV into a battery bay of the AGV.

In the embodiments depicted in FIGS. 14 and 15, both the BDV 10 and the battery 2 are lifted while the AGV 40 remains on the ground. In other words, the wheels 8 of BDV 10 are off ground, thereby enabling the AGV 40 to carry the BDV 10 during the battery exchange. FIG. 14 is a side view of a BDV 10 which is equipped with sets of pinion gears 58 capable of climbing up respective racks 56 lowered from AGV 40 in order to lift the battery 2 into a battery bay of AGV 40. Conversely, the pinion gears 58 may be rotated in directions that cause the BDV 10 to displace vertically downward relative to AGV 40 when a depleted battery is being removed from the battery bay of AGV 40. FIG. 15 shows a side view of a BDV 10 which is equipped with sets of sprocket wheels 89 capable of climbing up respective chains 88 lowered from AGV 40 in order to lift the battery 2 into a battery bay of AGV 40. Conversely, the sprocket wheels 89 may be rotated in directions that cause the BDV 10 to displace vertically downward relative to AGV 40 when a depleted battery is being removed from the battery bay of AGV 40.

Figure 16:
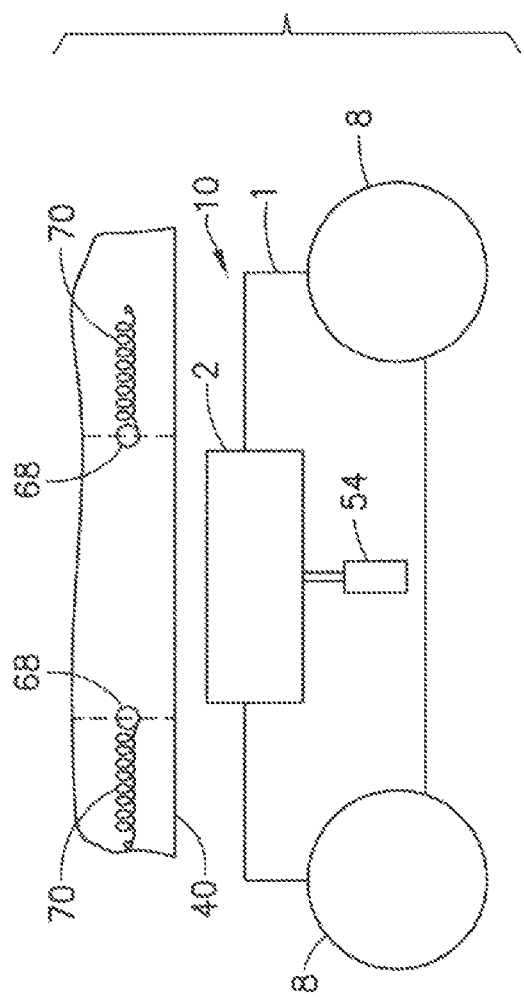
FIG. 16 is a diagram representing a side view of a BDV which is equipped with a cylinder for lifting the battery being carried by the BDV into a battery bay of an AGV which is equipped with spring-loaded drive rollers.

FIG. 16 is a diagram representing a side view of a BDV 10 equipped with one or more cylinders 54 which may be extended to lift the battery 2 into a battery bay of AGV 40. In alternative implementations, linear actuators other than cylinders 54 may be employed, such as lead screws or rack-and-pinion mechanisms. In addition, the AGV 40 is equipped with spring-loaded drive rollers 68. The opposing spring forces exerted by springs 70 urge a rising battery to be centered relative to a battery holder or reserved slot inside the battery bay of AGV 40. The lift mechanism in the BDV 10 is configured to lift battery 2 into contact with spring-loaded drive rollers 68, but less than the distance necessary to fully install battery 2. Once the battery 2 is in contact with the spring-loaded drive rollers 68, the spring-loaded drive rollers 68 are powered to rotate in directions such that battery 2 is further lifted off BDV 10 and into AGV 40. This "battery hand-off" operation enables a reduction in the height of BDV 10 relative to heights of some other embodiments.

In accordance with one embodiment, the spring-loaded drive rollers 68 are smooth rollers that use high side loading to create frictional forces that retain battery 2 as the rotating rollers move the battery upward. In accordance with another embodiment, the spring-loaded drive rollers 68 are gears that have teeth which engage parallel and spaced horizontal grooves on the sides of battery 2, which enables the rollers to interface with the battery with a lower side loading. In addition, ratcheting mechanisms are coupled to the drive rollers so that if power to the rollers is lost, the battery will not slip out of the battery compartment completely.

FIGS. 17 through 22 are diagrams representing sectional views of a battery bay 11 in accordance with various embodiments of an AGV 40. Each embodiment includes a battery holder that holds the battery 2 in a position such that the battery terminals are in contact with and pressed against respective spring-loaded electrical connector mechanisms 60. For example, a terminal of battery 2 may be electrically connected to the DC power bus 14 seen in FIG. 2 by way of a spring-loaded electrical connector mechanism 60 (see FIGS. 17-22) and a closed battery contactor 3a (see FIG. 2). In accordance with each of the embodiments depicted in FIGS. 17-22, the battery holder is activated to hold the battery 2 securely in the battery bay 11 in response to detection that the spring-loaded electrical connector mechanisms 60 are in contact with the terminals of battery 2.

Figure 17:
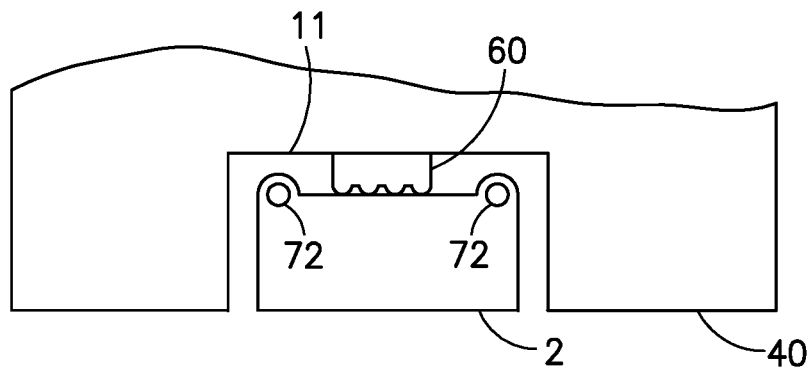
FIG. 17 is a diagram representing a sectional view of a battery bay of an AGV in which the battery is held in place (with battery terminals in contact with spring-loaded electrical connector mechanisms for power transfer) by rods which extend from the AGV into capture slots on the battery.

FIG. 17 shows a sectional view of a battery bay 11 of an AGV 40 in which the battery 2 is held in place (with battery terminals in contact with spring-loaded electrical connector mechanisms 60 for power transfer) by rods 72 which extend from the AGV 40 into mating capture slots (not visible in FIG. 17) on the battery. The rods 72 may be piston rods of pneumatic or hydraulic cylinders or may be driven to displace axially by an electric motor and associated gear train.

Figure 18:
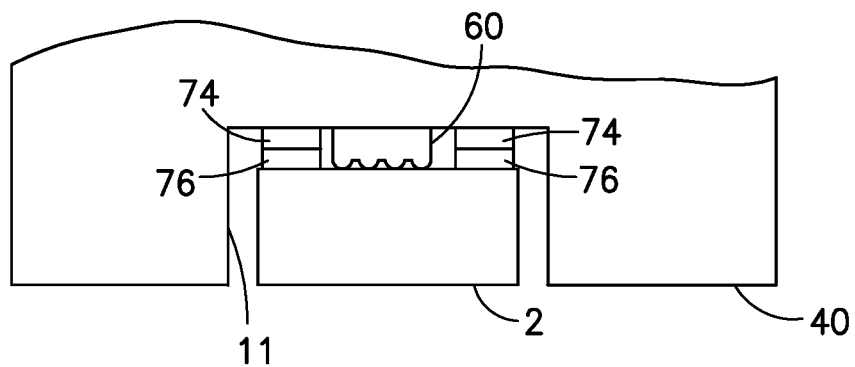
FIG. 18 is a diagram representing a sectional view of a battery bay of an AGV in which the battery is held in place by electromagnets so that the battery terminals contact spring-loaded electrical connector mechanisms for power transfer.

FIG. 18 shows a sectional view of a battery bay 11 of an AGV 40 in which the battery 2 is held in place by electro-permanent magnets 74 and ferromagnetic elements 76 so that the battery terminals contact spring-loaded electrical connector mechanisms 60 for power transfer. Electro-permanent magnets 74 are mounted to AGV 40; ferromagnetic elements 76 are attached to battery 2. An attraction force can be produced by turning on the electro-permanent magnets 74. The electro-permanent magnet 74 comprises a permanent magnet having North and South poles and a reversible electromagnet. Each electro-permanent magnet 74 will be respectively magnetically coupled to a ferromagnetic element 76, which ferromagnetic element 76 has South and North poles respectively magnetically coupled to the North and South poles of the electro-permanent magnet 74. Electro-permanent magnets are solid-state devices that have zero static power consumption (like permanent magnets), but can be switched on and off like electromagnets. The power only needs to be applied for a brief moment to toggle the state to either on or off, which makes it more useful for applications where overall power usage is preferably low. The use of electro-permanent magnets also has the benefit that, if power is lost, the coupling is still active. The electro-permanent magnet approach requires an electrical power source (e.g., a battery carried by the AGV), but it would only need to be energized for a brief moment to switch the magnetic field state.

Figure 19:
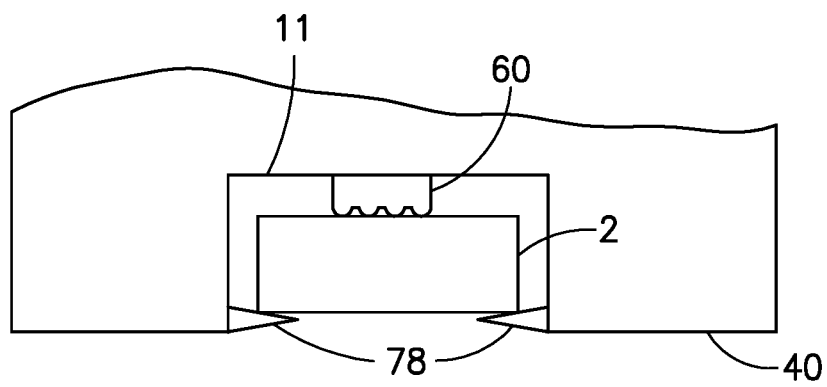
FIG. 19 is a diagram representing a sectional view of a battery bay of an AGV in which the battery is held in place by sliding wedges so that the battery terminals contact spring-loaded electrical connector mechanisms for power transfer.

FIG. 19 is a diagram representing a sectional view of a battery bay 11 of an AGV 40 in which the battery 2 is held in place by sliding wedges 78. The sliding wedges 78 are configured to slide in opposite directions concurrently. The wedge sliding motion may be driven by a single electric motor mechanically coupled to sliding wedges 78 by respective gear trains. Each wedge has a tapered surface. When the wedges are sliding inward, the tapered surfaces cam the battery upward so that the battery terminals press against the spring-loaded electrical connector mechanisms 60.

Figure 20:
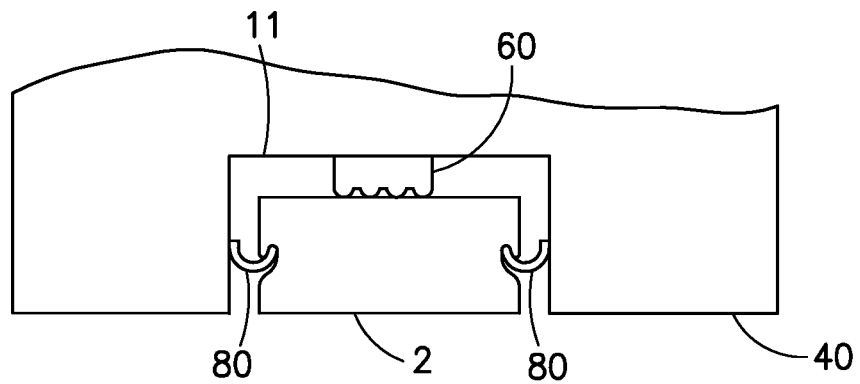
FIG. 20 is a diagram representing a sectional view of a battery bay of an AGV in which the battery is held in place by rotating latches so that the battery terminals contact spring-loaded electrical connector mechanisms for power transfer.

FIG. 20 is a diagram representing a sectional view of a battery bay 11 of an AGV 40 in which the battery 2 is held in place by rotating latches 80. The latches are activated to rotate in opposite directions at opposite sides of the battery bay 11 until the latches contact respective catches (e.g., offsets) on the sides of the battery 2. Again the latches may be locked in place to prevent battery 2 from falling out when electric power is lost.

Figure 21:
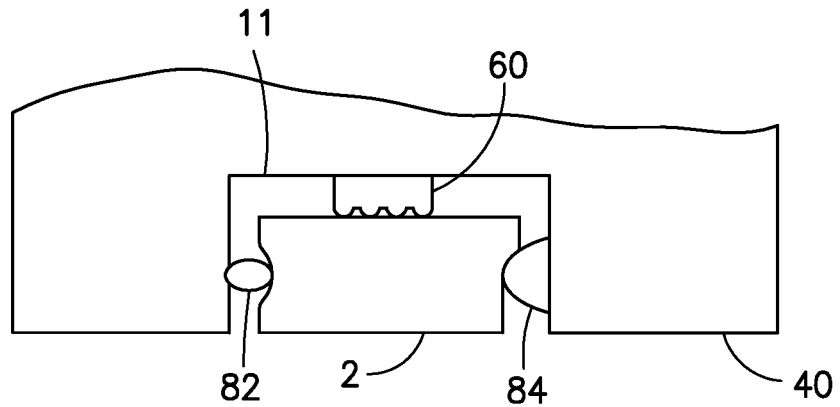
FIG. 21 is a diagram representing a sectional view of a battery bay of an AGV in which the battery is held in place by either a pair of rotating cam locks or a pair of inflatable bladders so that the battery terminals contact spring-loaded electrical connector mechanisms for power transfer.

FIG. 21 is a diagram representing a sectional view of a battery bay 11 of an AGV 40 in which the battery 2 is held in place by either a pair of rotating cam locks 82 (the opposing rotating cam lock is not shown) or a pair of inflatable bladders 84 (the opposing inflatable bladder is not shown). The battery 2 is "squeezed" by rotating cam locks 82 or inflatable bladders 84 to retain the battery 2 inside the battery bay 11.

Figure 22:
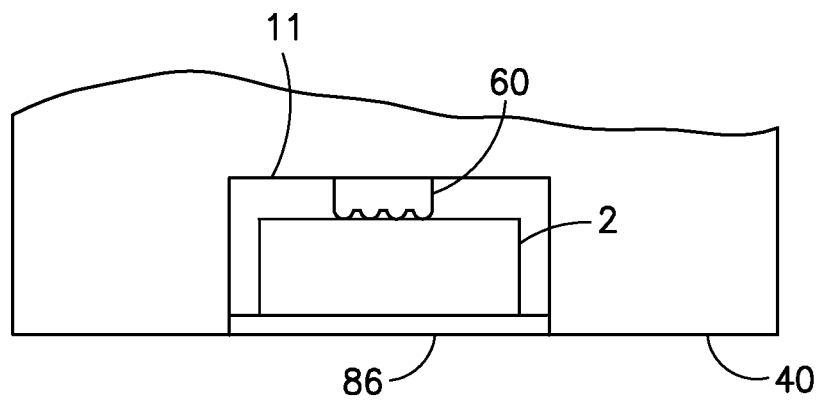
FIG. 22 is a diagram representing a sectional view of a battery bay of an AGV in which the battery is held in place by a door so that the battery terminals contact spring-loaded electrical connector mechanisms for power transfer.

FIG. 22 is a diagram representing a sectional view of a battery bay 11 of an AGV 40 in which the battery 2 is held in place by a bottom door 86. The bottom door 86 may slide or swing to open and close, but in the closed state, the bottom door 86 supports battery 2 in a vertical position where the terminals of battery 2 are electrically connected to the spring-loaded electrical connector mechanisms 60.

Figure 23:
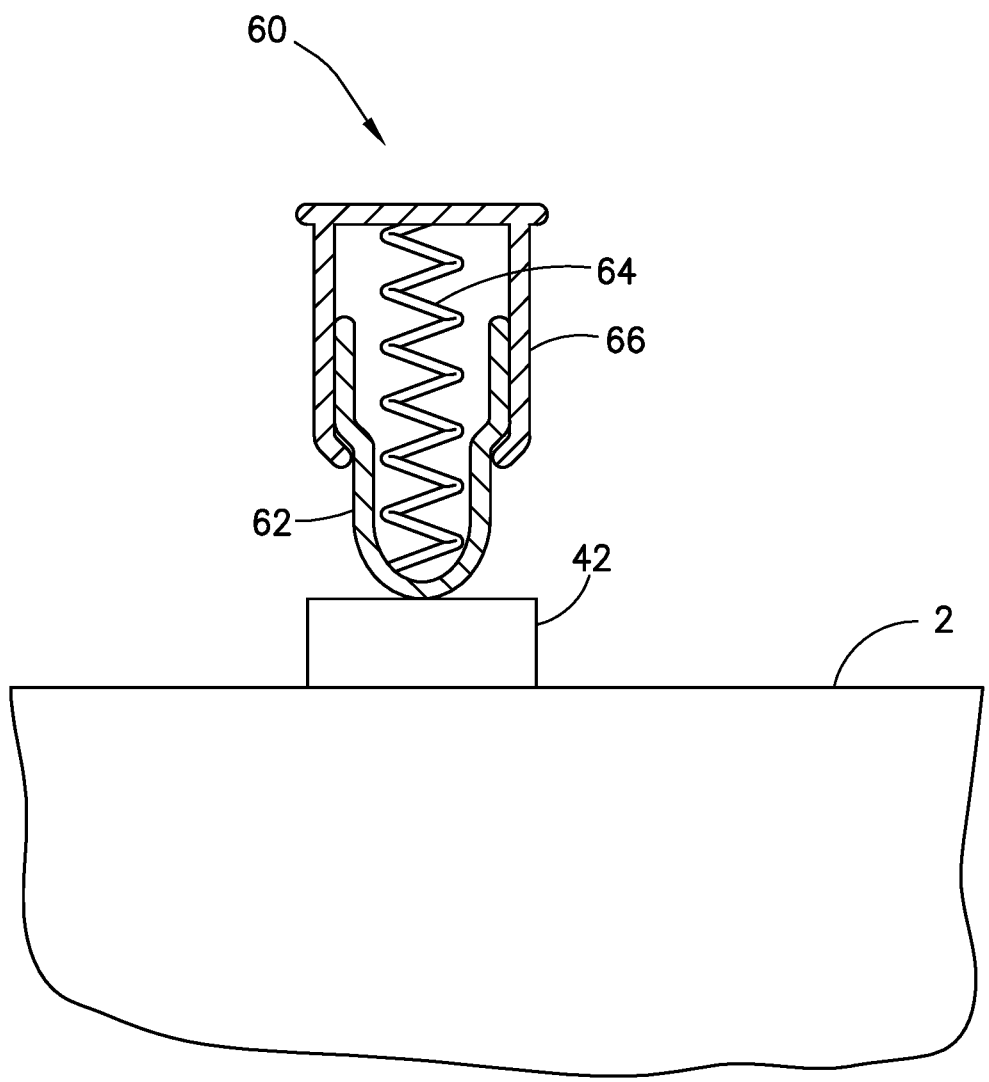
FIG. 23 is a diagram is a diagram representing a partly sectional side view of a spring-loaded electrical connector mechanism in contact with a battery terminal.

FIG. 23 is a diagram is a diagram representing a partly sectional side view of a spring-loaded electrical connector mechanism 60 in contact with a terminal 42 of a battery 2. A typical spring-loaded electrical connector mechanism 60 includes a barrel 66, a spring 64 disposed inside the barrel, and a contact plunger 62 which protrudes from barrel 66. The contact plunger is axially slidable inside barrel 66 between the extended position shown in FIG. 23 and a retracted position (not shown). The spring 64 urges the contact plunger 62 toward the extended position. The contact force exerted by terminal 42 on contact plunger 62 when battery 2 is fully inserted displaces the contact plunger 62 toward the retracted position. The mechanism shown in FIG. 23 maintains electrical contact between the battery terminal 42 and contact plunger 62 regardless of the axial position of the latter.

Figure 24:
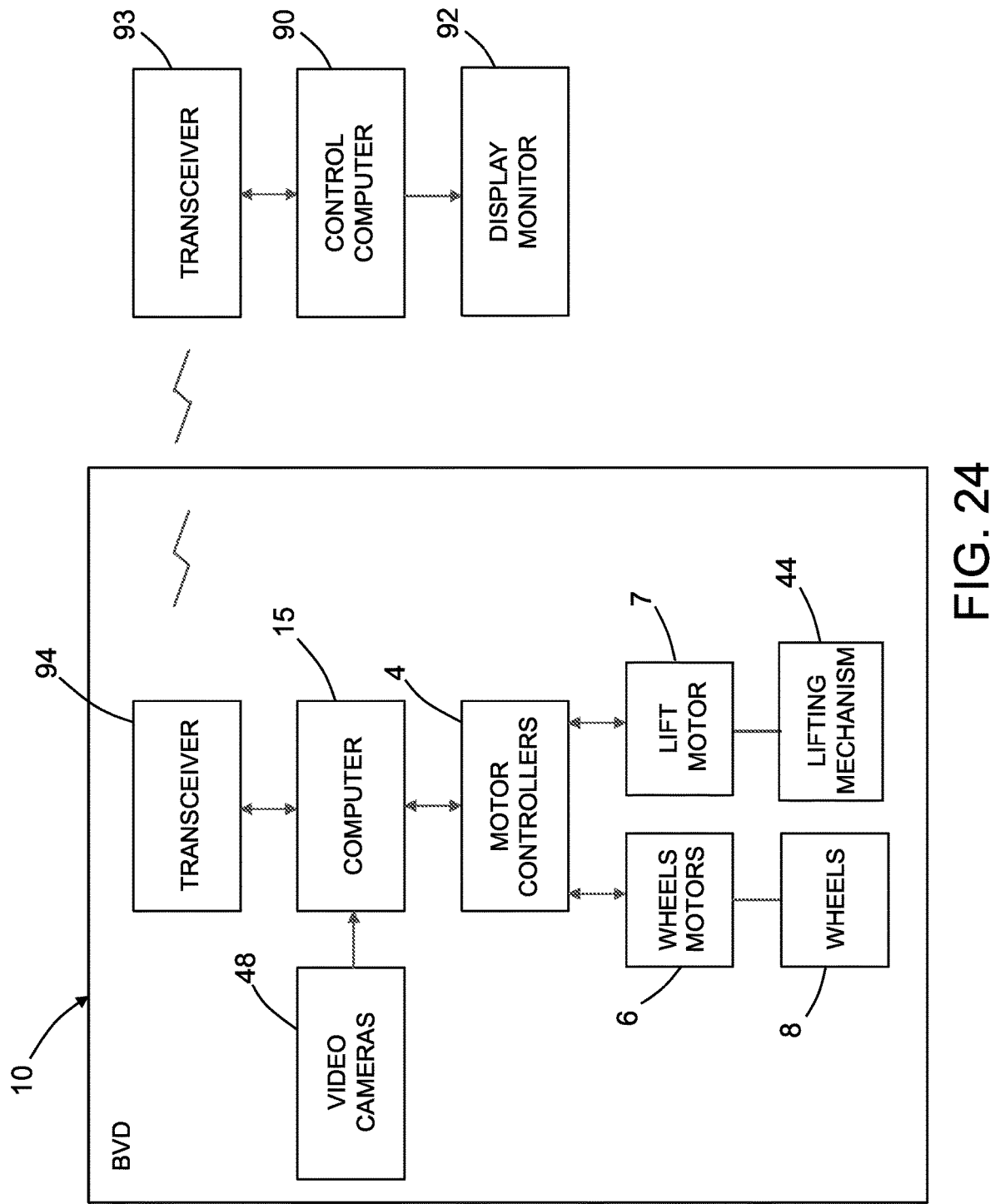
FIG. 24 is a block diagram identifying some components of a system in which a central computer system is capable of remotely controlling a BDV in accordance with one embodiment.

FIG. 24 is a block diagram identifying some components of a system in which a centrally located control computer 90 is capable of remotely controlling a BDV 10 in accordance with one embodiment. The BDV 10 depicted in FIG. 24 includes a computer 15, a plurality of video cameras 48, and a transceiver 94. The operation of video cameras 48 is controlled by computer 15. Computer 15 may include an image processing module which is configured to process image data received from cameras 48 to derive the location of BDV 10 relative to a battery-receiving electric vehicle. The computer 15 further communicates with a multiplicity of motor controllers 4, which respectively control the operation of a plurality of wheel motors 6 and a lift motor 7. The wheel motors 6, when activated, drive rotation of wheels 8. The lift motor 7, when activated, drives extension/retraction of the lifting mechanism 44.

The computer 15 outputs motor control signals which are a function of radiofrequency commands transmitted by a transceiver 93 which is communicatively coupled to the control computer 90. Those radiofrequency commands are received by transceiver 94 on-board BDV 10, converted into the proper digital format, and then forwarded to computer 15. The control computer 90 may comprise a general-purpose computer configured with programming for monitoring and controlling operation of BDV 10 in coordination with the operation of other autonomous electric vehicles within the same facility. In addition, the control computer 90 is configured with programming for processing image data captured by cameras 48 during a battery delivery. In particular, the control computer 90 may include a display processor configured with software for controlling a display monitor 92 to display images acquired by video cameras 48.

The optical image field, as sighted by a video camera 48, may be displayed on the display monitor 92.

Figure 25:
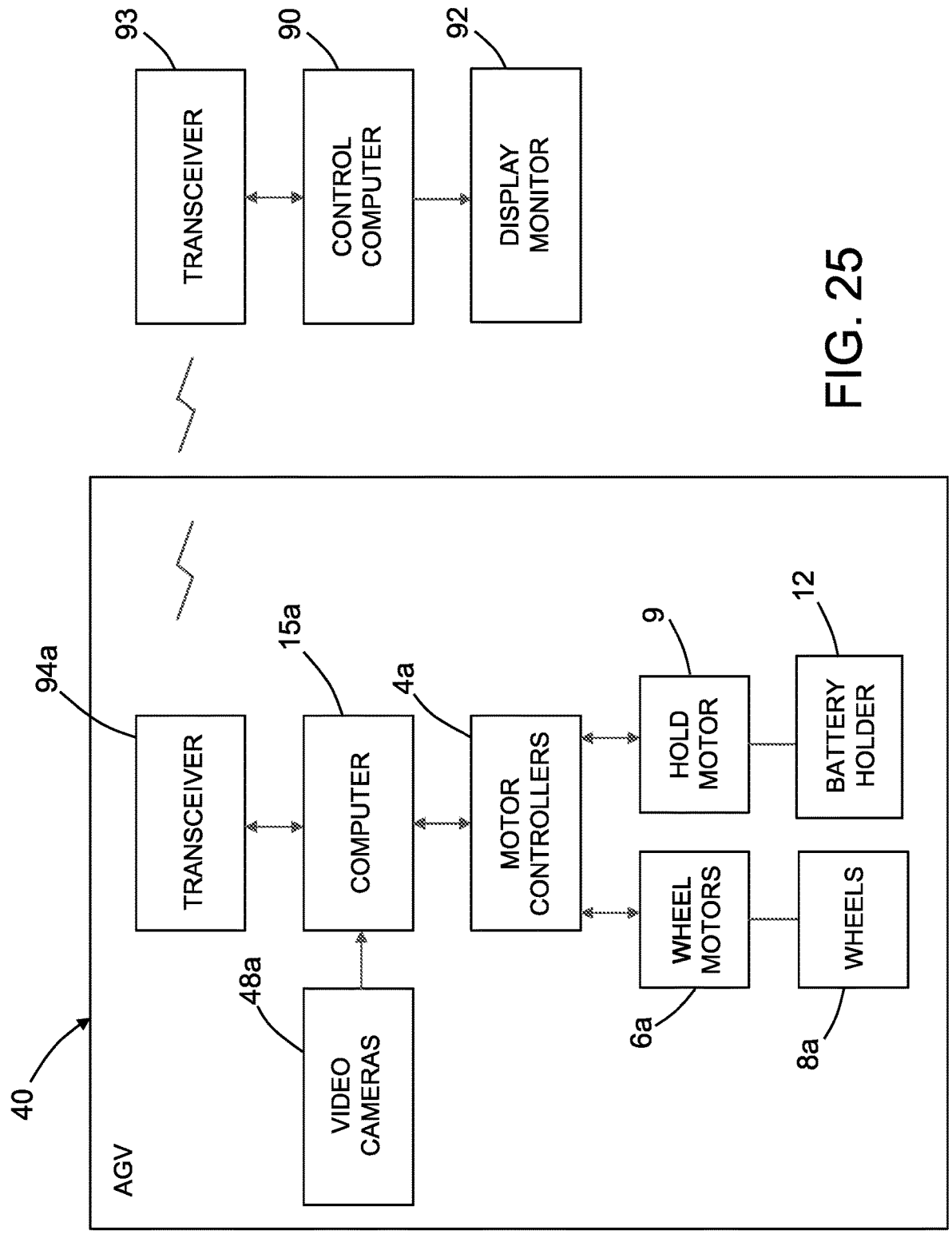
FIG. 25 is a block diagram identifying some components of a system in which a central computer system is capable of remotely controlling an AGV in accordance with one embodiment.

FIG. 25 is a block diagram identifying some components of a system in which a centrally located control computer 90 is capable of remotely monitoring and controlling an AGV 40 in accordance with one embodiment. The AGV 40 depicted in FIG. 25 includes a computer 15a, a plurality of video cameras 48a, and a transceiver 94a. The operation of video cameras 48a is controlled by computer 15a. Computer 15a may include an image processing module which is configured to process image data received from cameras 48a to detect the presence of an obstacle in the path of the AGV 40. The computer 15a further communicates with a multiplicity of motor controllers 4a, which respectively control the operation of a plurality of wheel motors 6a and a hold motor 9. The wheel motors 6a, when activated, drive rotation of wheels 8a. The hold motor 9, when activated, drives opening/closing of a battery holder 12.

The computer 15a outputs motor control signals which are a function of radiofrequency commands transmitted by a transceiver 93 which is communicatively coupled to the control computer 90. Those radiofrequency commands are received by transceiver 94 on-board AGV 40, converted into the proper digital format, and then forwarded to computer 15a. The control computer 90 may comprise a general-purpose computer configured with programming for controlling operation of AGV 40. In addition, the control computer 90 is configured with programming for processing image data captured by cameras 48a as the AGV 40 moves along a fixed path. In particular, the control computer 90 may include a display processor configured with software for controlling a display monitor 92 to display images acquired by video cameras 48a.

The computer 15 of BDV 10 (shown in FIG. 24) is also configured to send a status signal to control computer 90 indicating that a battery has been lifted by lifting mechanism 44. Similarly, the computer 15a of AGV 40 (shown in FIG. 25) is also configured to send a status signal to control computer indicating that a battery has been retained by a battery holder 12. Thus, the centrally located control computer 90 may receive signals originating from BDV 10 and AGV 40 which respectively indicate that a battery has been delivered and received.

In accordance with an alternative embodiment, the BDV 10 could be remotely controlled by an operator. In accordance with one option, the BDV 10 is fully remotely controlled by an operator, from leaving its "home" charging station to aligning with the AGV 40 for swapping the battery 2. In accordance with another option, the BDV 10 is remotely controlled by an operator to travel from its "home" charging station to the AGV 40. This distance would be the most unpredictable, especially in a factory environment with moving people, machines, and parts. Upon reaching the AGV 40, the BDV 10 would switch to an autonomous mode in which the location of BDV 10 relative to AGV 40 would be determined using one of the methods described in this disclosure. The BDV 10 would align with the AGV 40 and swap batteries autonomously.

In accordance with one proposed implementation, the control computer 90 would: (a) have a map of the environment, including keep-out zone; (b) communicate a travel path to the BDV 10, and then (c) update the travel path based upon updated location data from the AGV 40 and unpredicted obstacle data from the BDV 10. More specifically, when the AGV's battery starts running low, the AGV 40 broadcasts a signal to the control computer 90 requesting a battery swap. The broadcast signal includes the AGV's location, for example, as X-Y coordinates within a factory environment. The control computer 90 is configured to calculate a trajectory that will result in the BDV 10 arriving at the rendezvous place 32 (see FIG. 9A) at the same time when AGV 40 arrives there, taking into account obstacles and keep-out zones (for example, where a mill is operating, parts are stored on the ground, or an employee break room). Thereafter, the AGV 40 periodically (e.g., every 15 seconds) communicates its location to the control computer 90 for the purpose of updating the planned trajectory of BDV 10.

In accordance with an alternative embodiment, the computer 15 onboard BDV 10 is configured to plan a travel path through the environment to reach the rendezvous place. This configuration is especially useful when the electric vehicle requesting battery replacement is not an AGV and thus does not have a fixed predicted trajectory. In its memory, the BDV 10 would have a map of the environment, including keep-out zones. The BDV 10 would plan its travel path given these keep-out zones. As the BDV 10 travels to the EV 20, the BDV 10 updates its travel path given: (a) new location data from the EV 20; and (b) obstacles in the way of its planned path detected perhaps via visual or sonar-like methods.

Using various sensors, the BDV 10 moves to a battery delivery position underneath the EV 20 at a known location in the frame of reference of the EV 20. In addition, the control system (onboard the BDV or at an operations center) identifies the empty battery compartment onboard the EV 20. Whichever battery compartment is identified, the location of that battery compartment in the frame of reference of the EV 20 is known to computer 15 of the BDV 10 (e.g., data stored in a non-transitory tangible computer-readable storage medium). The BDV 10 maneuvers underneath the EV 20 until the battery to be delivered is vertically aligned with the empty battery compartment and then automatically installs the replacement battery while the EV 20 and BDV 10 are still moving at the same speed and in tandem. In accordance with embodiments of BDV 10 which have only a single battery seat, after delivering the charged battery, the BDV 10 maneuvers beneath the depleted battery 2b (see FIG. 2) in the battery bay 11 of EV 20 and then receives the depleted battery 2b on the battery seat. After the BDV 10 has received the depleted battery 2b, the BDV 10 returns to the battery charging station where the depleted battery 2b is recharged.

In accordance with an alternative embodiment, the BDV 10 may also be an automated guided vehicle capable of traveling along the same fixed path along which the AGV 40 travels. In this case, the BDV 10 follows the AGV 40 at a speed greater than the speed of AGV 40 until the BDV 10 catches up to AGV 40 at the rendezvous place 32.

Figure 26:
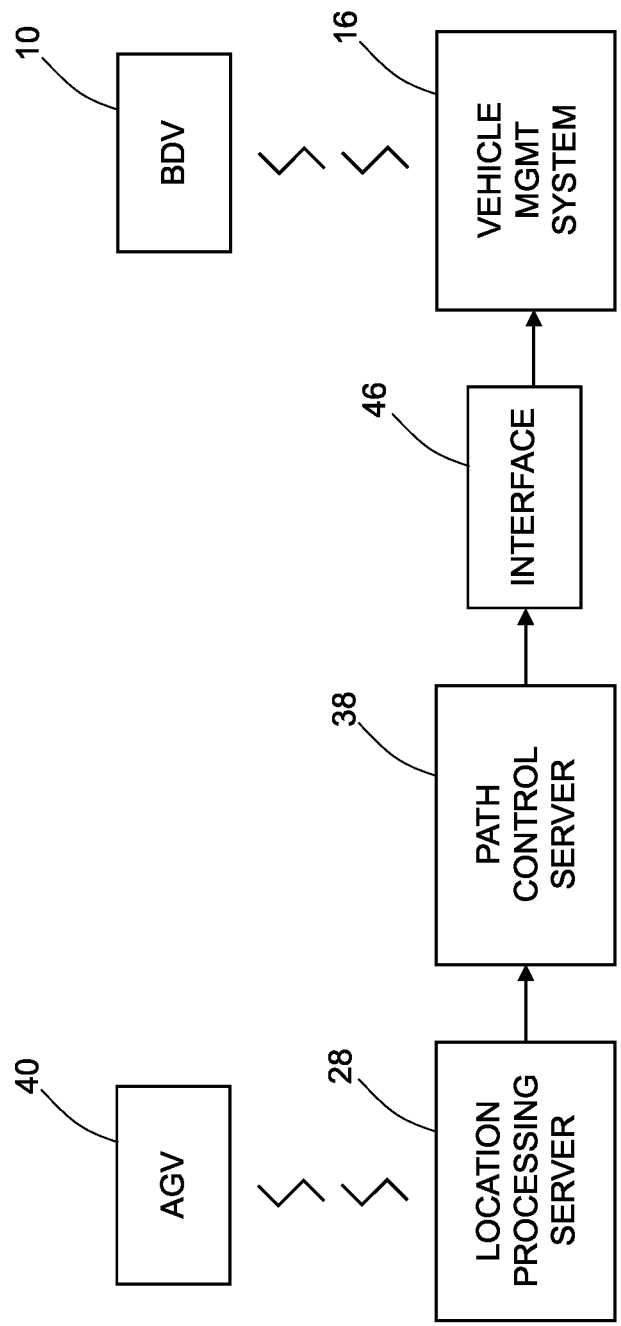
FIG. 26 is a block diagram identifying some components of a computer system configured to calculate a path of a BDV to a rendezvous place with an AGV that has summoned a replacement battery in accordance with one embodiment.

FIG. 26 is a block diagram identifying some components of a computer system configured to calculate a path of a BDV 10 to a rendezvous place 32 with an AGV 40 that has summoned a replacement battery in accordance with one embodiment. The computer system includes a location processing server 28 that receives location data from the AGV 40, a path control server 38 that is configured to calculate a travel path for the BDV 10 based in part on the location data provided by AGV 40 and generate guidance signals for use by the BDV 10, and a vehicle management system 16 which is communicatively coupled to receive guidance signals from path control server 38 via an interface 46. The guidance signals may include alert messages to the vehicle management system 16 to initiate delays, reroute, or emergency stop to avoid collision. The vehicle management system 16 is configured for controlling movement of all BDVs, including sending control signals for altering the planned path of any BDV when an obstruction is detected. Since the vehicle management system 16 is supplier-specific, the interface 46 is configured to address this issue by receiving data in a common format and then converting it to the specific format required by the supplier-specific vehicle management system.

As the BDV 10 and AGV 40 travel along respective paths, onboard communications processors communicate wirelessly with the closest wireless access point of a plurality of wireless access points having fixed locations in the factory. Each wireless access point may be placed on the factory floor, suspended from a ceiling, or mounted to an interior wall.

The system for guiding AGVs and BDVs may further comprise a multiplicity of cameras arranged to surveil an area intersected by the planned path of the AGV. In this case, the system would also include an image processing server connected to receive the image data acquired by the multiplicity of cameras during surveillance of the area.

Figure 27:
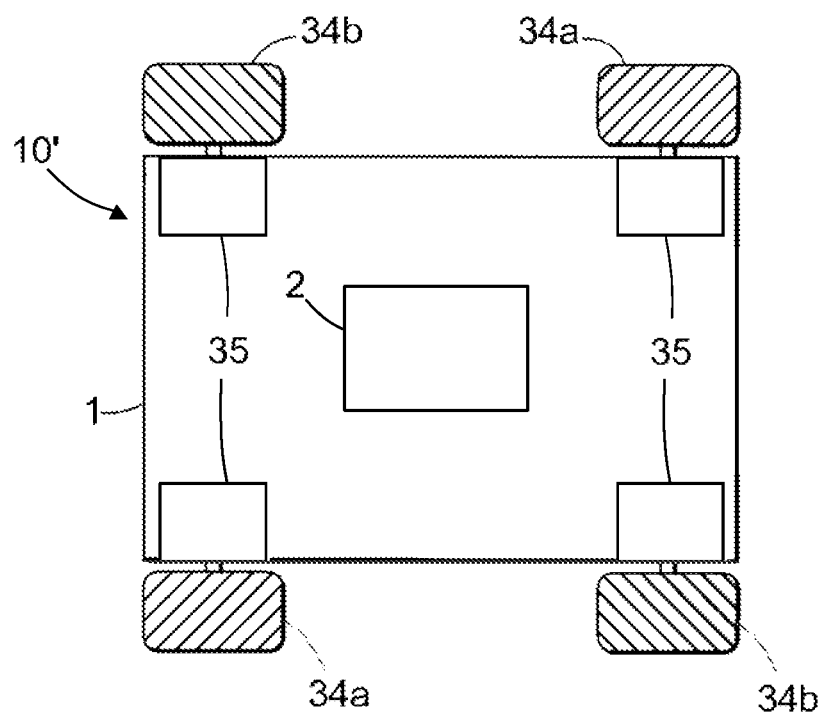
FIG. 27 is a diagram representing a top view of a holonomic-motion BDV in accordance with one embodiment.

In one proposed implementation, the BDV 10 may be a holonomic-motion electric crawler vehicle, in which case the wheels may be Mecanum wheels. FIG. 27 shows parts of a holonomic-motion BDV 10' having four Mecanum wheels in accordance with one embodiment. The electrical connections for supplying signals for controlling operation of the depicted components are not shown. This holonomic-motion platform comprises a frame 1 with four Mecanum wheels: two type "A" Mecanum wheels 34a and two type "B" Mecanum wheels 34b mounted to the frame 1 by means of respective axles. The holonomic-motion BDV 10' further includes four independently controlled stepper motors 35. Each stepper motor 35 controls the rotation of a respective wheel 8.

The BDV 10 may have any multiple of four Mecanum wheels, e.g., 4, 8, 12, etc. The standard configuration for a Mecanum-wheeled vehicle has four Mecanum wheels (two type "A" and two type "B"). The Mecanum wheels are arranged with the "A" pair on one diagonal and the "B" pair on the other. Each Mecanum wheel has a multiplicity of tapered rollers rotatably mounted to its circumference, each roller being freely rotatable about its axis. These rollers have an axis of rotation which lies at a 45-degree angle with respect to the plane of the wheel. Type "A" Mecanum wheels 34a have left-handed rollers, while Type "B" Mecanum wheels 34b have right-handed rollers. Such a Mecanum-wheeled vehicle can be made to move in any direction and turn by varying the speed and direction of rotation of each wheel. For example, rotating all four wheels in the same direction at the same rate causes forward or backward movement; rotating the wheels on one side at the same rate but in the opposite direction of the rotation by the wheels on the other side causes the vehicle to rotate; and rotating the Type "A" wheels at the same rate but in the opposite direction of the rotation of the Type "B" wheels causes sideways movement.

The technology proposed herein has significant benefits over the existing solutions. To start, the proposed technology does not result in any no-value time, which allows an AGV to consistently perform its mission. Additionally, the proposed technology has capital expense less than the capital expense involved with a full complement of redundant (backup) AGVs, because only a small group of BDVs would be sufficient to maintain the AGV batteries across an entire production system. Lastly, the proposed technology allows batteries to have longer battery life. This is possible because batteries would not be required to be charged fully to 100% every time, which depletes batteries quickly. Instead, batteries could be maintained at 80% and simply swapped out more often, as the swapping operation has no appreciable effect on the AGV operation.

While systems and methods for automated in-situ swapping of batteries for EVs have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The embodiments disclosed above use one or more computer systems. As used in the claims, the term "computer system" comprises a single processing or computing device or multiple processing or computing devices that communicate via wireline or wireless connections. Such processing or computing devices typically include one or more of the following: a processor, a controller, a central processing unit, a microcontroller, a reduced instruction set computer processor, an application-specific integrated circuit, a programmable logic circuit, a field-programmable gated array, a digital signal processor, and/or any other circuit or processing device capable of executing the functions described herein. The above examples are exemplary only, and thus are not intended to limit in any way the definition and/or meaning of the term "computer system".

At least some of the operations described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

In the method claims appended hereto, the alphabetic ordering of steps is for the sole purpose of enabling subsequent short-hand references to antecedent steps and not for the purpose of limiting the scope of the claim to require that the method steps be performed in alphabetic order.

The invention claimed is:

1. A method for installing a first battery on an electric vehicle using a battery delivery vehicle which is disposed underneath and mechanically coupled to the electric vehicle so that the electric vehicle and battery delivery vehicle are movable in tandem, wherein:

the electric vehicle comprises a first frame having a battery bay and a first battery holder disposed in the battery bay; and the battery delivery vehicle comprises a second frame that supports the first battery which is disposed underneath and aligned with the first battery holder when the electric vehicle and the battery delivery system are mechanically coupled, and wherein the method comprises:

(a) charging the first battery;
(b) placing the first battery onboard the battery delivery vehicle;
(c) moving the battery delivery vehicle to a rendezvous place whereat the battery delivery vehicle is underneath the electric vehicle;
(d) moving the battery delivery vehicle relative to the electric vehicle until the first battery is vertically aligned with an empty space in the battery bay of the electric vehicle where the first battery holder capable, when activated, of holding the first battery;

(e) raising the first battery until the first battery occupies the empty space;
(f) activating the first battery holder to hold the first battery;
(g) supplying DC power from the first battery to a DC power bus onboard the electric vehicle subsequent to step (f); and
(h) disconnecting a second battery from the DC power bus subsequent to step (g), the second battery being held in the battery bay by a second battery holder,
wherein steps (c) through (h) are performed under computer control; and
wherein a charge level of the first battery higher than a charge level of the second battery.

2. The method as recited in claim 1, further comprising:
(i) activating the second battery holder to release the second battery subsequent to step (h); and
(j) lowering the released second battery out of the battery bay subsequent to step (i).

3. The method as recited in claim 2, wherein the electric vehicle is an automated guided vehicle, the method further comprising:
moving the automated guided vehicle to the rendezvous place during step (c); and
moving the battery delivery vehicle and the automated guided vehicle at a same speed along a common travel path during step (e).

4. The method as recited in claim 3, further comprising mechanically coupling the automated guided vehicle to move in tandem with the battery delivery vehicle subsequent to step (d) and prior to step (e).

5. The method as recited in claim 2, wherein step (e) comprises raising the battery delivery vehicle and first battery together and step (j) comprises lowering the battery delivery vehicle and second battery together.

6. The method as recited in claim 2, wherein step (e) comprises moving the first battery upward relative to the battery delivery vehicle and step (j) comprises moving the second battery downward relative to the battery delivery vehicle.

7. The method as recited in claim 2, wherein step (d) comprises:
(k) acquiring sensor data representing a current location of the battery delivery vehicle in a frame of reference of the electric vehicle;
(l) calculating a simulated deviation of the current location from a target location at which the first battery is aligned with the empty space in the battery bay based on the sensor data; and
(m) moving the battery delivery vehicle relative to the electric vehicle to decrease an actual deviation,
wherein steps (k) through (m) are iteratively performed until the simulated deviation calculated in step (l) is less than a specified threshold.

8. The method as recited in claim 1, further comprising:
location signals broadcasting electric vehicle representing a current location of the electric vehicle;
calculating a predicted trajectory of the electric vehicle; and
calculating a predicted trajectory of the battery delivery vehicle in order for the battery delivery vehicle and electric vehicle to arrive at the rendezvous place concurrently,
wherein step (c) comprises controlling the battery delivery vehicle to move along a path at a speed dictated by the predicted trajectory of the battery delivery vehicle.

9. A system comprising an electric vehicle and a battery delivery vehicle disposed underneath and mechanically coupled to the electric vehicle so that the electric vehicle and battery delivery vehicle are movable in tandem, wherein:
the electric vehicle comprises a first frame having a battery bay and a first battery holder disposed in the battery bay; and
the battery delivery vehicle comprises a second frame that supports a first battery which is disposed underneath and aligned with the first battery holder,
wherein the electric vehicle further comprises chains which are extendible downward, and the battery delivery vehicle further comprises:
sprockets having teeth which engage a respective chain; and
lift motors operatively coupled to drive rotation of the sprockets in directions which cause the battery delivery vehicle to rise toward the electric vehicle.

10. The system as recited in claim 9, wherein the electric vehicle comprises a plurality of code pattern markers disposed on an undersurface of the frame of the electric vehicle, each code pattern marker having a code pattern indicating a respective location of the code pattern marker in a frame of reference of the electric vehicle, and wherein the battery delivery vehicle comprises:
a plurality of cameras having respective focal axes which intersect the undersurface of the frame of the electric vehicle; and
a computer configured to control movement of the battery delivery vehicle to align the first battery with the first battery holder prior to mechanical coupling to the electric vehicle in dependence on code patterns of code pattern markers within fields of view of the plurality of cameras.

11. The system as recited in claim 10, wherein the battery delivery vehicle comprises means for lifting the first battery.

12. The system as recited in claim 9, wherein the electric vehicle comprises a plurality of beacon transmitters attached to the electric vehicle and configured to transmit signals representing respective beacon transmitter identification codes, and wherein the battery delivery vehicle comprises:
a receiver mounted to the frame of the battery delivery vehicle; and
a computer configured to control movement of the battery delivery vehicle to align the first battery with the first battery holder prior to mechanical coupling to the electric vehicle in dependence on beacon transmitter identification codes received by the receiver.

13. The system as recited in claim 9, wherein the battery delivery vehicle further comprises:
a plurality of wheels rotatably mounted to the second frame;
a plurality of wheel motors equal in number to the number of wheels, each wheel motor being operable to drive rotation of a respective one of the wheels;
a plurality of sensors installed on the second frame and configured to acquire sensor data representing relative location information from a surface overlying the second frame; and
a first controller programmed to perform operations comprising:
controlling the wheel motors to move the second frame to a location where the first battery is vertically aligned with the first battery holder; and
controlling the lift motors to drive rotation of the sprockets to cause the battery delivery vehicle to rise toward the electric vehicle.

14. The system as recited in claim 13, wherein the wheels are Mecanum wheels and the sensors are cameras.

15. The system as recited in claim 13, wherein the electric vehicle further comprises:
- a hold motor operatively coupled to the first battery holder to cause the first battery holder to hold the first battery when the hold motor is activated;
- a pair of spring-loaded electrical connector mechanisms which are in contact with respective terminals of the first battery; and
- a second controller programmed to
- control the hold motor to open the first battery holder while the first frame is moving forward.

16. The system as recited in claim 15, wherein the electric vehicle further comprises:
- a second battery holder disposed in the battery bay;
- a sensor in the battery bay which detects a change of state of the second battery holder from an empty state to a state in which the second battery holder is holding a second battery;
- a DC power bus;
- a first contactor which connects the DC power bus to the first battery when the first contactor is closed and disconnects the DC power bus from the first battery when the first contactor is opened;
- a second contactor which connects the DC power bus to the second battery when the second contactor is closed and disconnects the DC power bus from the second battery when the second contactor is opened; and
- a battery management system configured to close the second contactor and open the first contactor in response to a signal from the sensor indicating that the change of state of the second battery holder has occurred.

17. A method for installing a first battery on an electric vehicle using a battery delivery vehicle, wherein the electric vehicle comprises a first frame having a battery bay and a first battery holder disposed in the battery bay, the battery delivery vehicle comprises a second frame that supports the first battery, and the method comprises:
    (a) charging the first battery;
    (b) placing the first battery onboard the battery delivery vehicle;
    (c) moving the battery delivery vehicle to a rendezvous place whereat the battery delivery vehicle is underneath the electric vehicle;
    (d) moving the battery delivery vehicle relative to the electric vehicle until the first battery is vertically aligned with an empty space in the battery bay of the electric vehicle where the first battery holder is capable, when activated, of holding the first battery;
    (e) mechanically coupling the battery delivery vehicle to the electric vehicle while the first battery is vertically aligned with the empty space in the battery bay of the electric vehicle;
    (f) moving the mechanically coupled battery delivery vehicle and electric vehicle in tandem;
    (g) raising the first battery until the first battery occupies the empty space while the mechanically coupled battery delivery vehicle and electric vehicle are moving in tandem;
    (h) activating the first battery holder to hold the first battery;
    (i) supplying DC power from the first battery to a DC power bus onboard the electric vehicle subsequent to step (h); and
    (j) disconnecting a second battery from the DC power bus subsequent to step (i), the second battery being held in the battery bay by a second battery holder,
    wherein steps (c) through (j) are performed under computer control; and
    wherein a charge level of the first battery is higher than a charge level of the second battery.

18. The method as recited in claim 17, further comprising:
    (k) activating the second battery holder to release the second battery subsequent to step (j); and
    (l) lowering the released second battery out of the battery bay subsequent to step (k).

19. The method as recited in claim 18, wherein step (g) comprises raising the battery delivery vehicle and the first battery together and step (l) comprises lowering the battery delivery vehicle and the second battery together.

20. The method as recited in claim 18, wherein step (g) comprises moving the first battery upward relative to battery delivery vehicle and step (l) comprises moving the second battery downward relative to the battery delivery vehicle.

* * * * *

UNITED STATES PATENT AND TRADEMARK OFFICE
CERTIFICATE OF CORRECTION

PATENT NO. : 12,122,332 B2  
APPLICATION NO. : 17/518269  
DATED : October 22, 2024  
INVENTOR(S) : Gary E. Georgeson, Tyler E. Berkey and Alexander J. Coco Page 1 of 1

It is certified that error appears in the above-identified patent and that said Letters Patent is hereby corrected as shown below:

In the Claims

Column 20, Line 66, correct "electric vehicle where the first battery holder capable," to read -- electric vehicle where the first battery holder is capable, --.

Column 21, Line 14, correct "wherein a charge level of the first battery higher than a" to read -- wherein a charge level of the first battery is higher than a --.

Column 21, Line 57, correct "location signals broadcasting electric vehicle representing" to read -- broadcasting electric vehicle location signals representing --.

Signed and Sealed this  
Seventeenth Day of December, 2024

Derrick Brent  
*Acting Director of the United States Patent and Trademark Office*